United States Patent
Zhang et al.

(10) Patent No.: US 12,092,482 B2
(45) Date of Patent: Sep. 17, 2024

(54) METHODS AND SYSTEMS FOR LASER DISTANCE MEASURING, FOUSING METHODS AND SYSTEMS, AND DEVICES FOR AUTO-FOCUSING ANALYSIS

(71) Applicant: SHANGHAI RUIYU BIOTECH CO., LTD., Shanghai (CN)

(72) Inventors: Xiaojia Zhang, Shanghai (CN); Puwen Luo, Shanghai (CN); Yifei Wu, Shanghai (CN)

(73) Assignee: SHANGHAI RUIYU BIOTECH CO., LTD., Shanghai (CN)

(*) Notice: Subject to any disclaimer, the term of this patent is extended or adjusted under 35 U.S.C. 154(b) by 0 days.

(21) Appl. No.: 18/362,931

(22) Filed: Jul. 31, 2023

(65) Prior Publication Data
US 2023/0375341 A1    Nov. 23, 2023

Related U.S. Application Data

(63) Continuation of application No. PCT/CN2022/070283, filed on Jan. 5, 2022.

(30) Foreign Application Priority Data

Jan. 29, 2021   (CN) .......................... 202110127353.8
Jan. 29, 2021   (CN) .......................... 202110129848.4

(51) Int. Cl.
    *G01C 3/08*    (2006.01)
    *G01C 3/02*    (2006.01)
    (Continued)

(52) U.S. Cl.
    CPC ............... *G01C 3/02* (2013.01); *G02B 21/12* (2013.01); *G02B 21/245* (2013.01)

(58) Field of Classification Search
    CPC .......... G01C 3/02; G02B 21/12; G02B 21/245
    See application file for complete search history.

(56) References Cited

U.S. PATENT DOCUMENTS 6,088,106 A        7/2000   Röckseisen
2013/0094016 A1    4/2013   Knebel et al.
(Continued)

FOREIGN PATENT DOCUMENTS

CA      2875314 A1 *  8/2013   ............. G01S 17/32
CN      101106250 A    1/2008
(Continued)

OTHER PUBLICATIONS

Zhou, Liping et al., Design of Pocket Laser Measuring Device Based on PSD, Tool Engineering, 2006, 3 pages.
(Continued)

*Primary Examiner* — Mark Hellner
(74) *Attorney, Agent, or Firm* — METIS IP LLC

(57)  ABSTRACT

A method for laser distance measuring includes: emitting an incident ray α having an incident angle δ to a reflective surface of a laser reflecting mirror (31), the incident ray α being reflected by the laser reflecting mirror (31) to generate a first reflected ray β, and the first reflected ray β irradiating an object to be measured (1000); capturing a second reflected ray θ and generating a laser image on a laser imaging plane (3221), the second reflected ray θ being generated by the reflective surface of the laser reflecting mirror (31) reflecting a return ray γ generated after the first reflected ray β irradiates a surface of the object to be measured; and determining, based on the laser image, a measurement distance A according to a geometrical trigonometry.

18 Claims, 13 Drawing Sheets

(51) Int. Cl.
*G02B 21/12* (2006.01)
*G02B 21/24* (2006.01)

(56) References Cited

U.S. PATENT DOCUMENTS

| | | | |
|---|---|---|---|
| 2015/0300800 | A1 | 10/2015 | Vanvalkenburgh et al. |
| 2017/0176575 | A1* | 6/2017 | Smits .................... G01S 7/4808 |

FOREIGN PATENT DOCUMENTS

| | | | |
|---|---|---|---|
| CN | 101419061 | A | 4/2009 |
| CN | 102819014 | A | 12/2012 |
| CN | 103076802 | | 5/2013 |
| CN | 103196461 | | 7/2013 |
| CN | 103322920 | | 9/2013 |
| CN | 103673884 | | 3/2014 |
| CN | 104316022 | A | 1/2015 |
| CN | 104949953 | | 9/2015 |
| CN | 105572678 | | 5/2016 |
| CN | 105676229 | | 6/2016 |
| CN | 105759280 | | 7/2016 |
| CN | 106679618 | | 5/2017 |
| CN | 110865336 | | 3/2020 |
| CN | 111366090 | | 7/2020 |
| CN | 111556962 | | 8/2020 |
| CN | 211627931 | | 10/2020 |
| CN | 112051244 | A | 12/2020 |
| CN | 112798566 | A | 5/2021 |
| CN | 112946673 | A | 6/2021 |
| FR | 2751068 | A1 | 1/1998 |
| JP | 3602925 | B2 * | 12/2004 ............ G01N 24/45 |
| JP | 2010072017 | A | 4/2010 |

OTHER PUBLICATIONS

Fu, Xian-Bin et al., A Displacement Measurement System Based on Optical Triangulation Method, Optoelectronics Letters, 7(5): 380-383, 2011.
Xu, Shixue et al., Realizable Method of Laser Distance-Measuring System with Small-size and High Accuracy, Infrared and Laser Engineering, 2008, 4 pages.
He, Runfeng et al., The Magical Triangle in Distance and Displacement Measurement and Control for Laser Short-Range Target, SCIENCE & Technology Vision, 2018, 3 pages.
Chen, Genyu et al., Study on the Accuracy for Laser Truing and Dressing of Bronze-Bonded Diamond Wheels, Chinese Journal of Lasers, 36(5): 1278-1281, 2009.
Guo, Wei Qin et al., Review of 3D Stereo Vision Measure and Reconstruction Based on Mirror Image, Computer Science, 43(9), 2016, 11 pages.
First Office Action in Chinese Application No. 202110127353.8 mailed on Mar. 23, 2022, 12 pages.
Decision to Grant a Patent in Chinese Application No. 202110127353.8 mailed on Sep. 28, 2022, 6 pages.
International Search Report in PCT/CN2022/070283 mailed on Mar. 30, 2022, 6 pages.
Written Opinion in PCT/CN2022/070283 mailed on Mar. 30, 2022, 11 pages.
The Extended European Search Report in European Application No. 22745001.2 mailed on May 22, 2024, 8 pages.

* cited by examiner

METHODS AND SYSTEMS FOR LASER DISTANCE MEASURING, FOUSING METHODS AND SYSTEMS, AND DEVICES FOR AUTO-FOCUSING ANALYSIS

CROSS-REFERENCE TO RELATED APPLICATIONS

The present disclosure is a Continuation of International Application No. PCT/CN2022/070283, filed on Jan. 5, 2022, which claims the priority of Chinese Application No. 202110127353.8, filed on Jan. 29, 2021, and the priority of Chinese Application 202110129848.4, filed on Jan. 29, 2021, the contents of each of which are hereby incorporated by reference.

TECHNICAL FIELD

The present disclosure relates to the technical field of microscopic analysis and distance measurement, in particular, relates to a method and a system for laser distance measurement, a focusing method and system, and a device for auto-focusing analysis.

BACKGROUND

Laser distance measuring uses a laser as a light source for distance measuring. Due to the flexibility, efficiency, and high accuracy, the laser distance measuring has been widely applied in the field of measurement.

According to different principles, the laser distance measuring mainly include a pulse-based laser distance measuring, a phase-based laser distance measuring, an interferometry-based laser distance measuring, a feedback-based laser distance measuring, and a triangulation-based laser distance measuring.

The pulse-based laser distance measuring determines a distance of a target by measuring a spatial propagation time between an emitted pulse signal and a received reflected signal from the target. The phase-based laser distance measuring detects a distance by measuring a phase difference that occurs when an emitted light and a reflected light propagate in space. The interferometry-based laser distance measuring is a precise measurement manner that utilizes the principle of optical interference and uses a laser as the light source, and uses the laser wavelength or frequency as the benchmark. The feedback-based laser distance measuring uses the technology of conversion between the distance and the transmission time, and conversion between the transmission time and the oscillation frequency to measure laser transmission time, so as to achieve the purpose of the feedback-based laser distance measuring.

The triangulation-based laser distance measuring includes emitting light from a laser, focusing the emitted light through a converging lens to be incident onto a surface of an object to be measured, receiving a return light from the incident point by a receiving lens, and imaging the return light onto a sensitive surface of a photoelectric position detector. When the object moves, a relative distance of the object's movement is determined by determining a displacement of a light spot on the imaging surface.

Table. 1 shows a comparison table of distance measuring ranges and accuracies of different laser distance measuring techniques.

TABLE 1

Comparison table of distance measuring ranges and accuracies of different laser distance measuring techniques

| Laser distance measuring technique | Range | Accuracy |
| --- | --- | --- |
| Pulse-based | Tens of meters to tens of thousands of kilometers | Meter level |
| Phase-based | A few meters to several kilometers | Millimeter level |
| Interferometry-based | Centimeter level | Micrometer level |
| Feedback-based | A few meters to a few centimeters | Centimeter level |
| Triangulation-based | Millimeter level | Micrometer level |

Among various laser distance measuring techniques, the triangulation-based laser distance measuring is widely used in focusing of most microscopic instruments and equipment for its high accuracy, short measuring time, and suitability for short-distance testing. However, in the triangulation-based laser distance measuring, the ray of light is usually directly incident on the surface of the object to be measured after being focused by the converging lens, and the receiving lens receives the return light from the incident point and images the received returned light onto the sensitive surface of the photoelectric position detector. When the object moves, the relative distance of the object's movement is determined by calculating the displacement of the light spot on the imaging surface. Also, the triangulation-based method for laser distance measuring determines the distance to the object to be measured according to a principle of triangle similarity by directly lasing the surface of the object to be measured. In practical applications, confined installation environments or layout position constraints prevent the placement of a triangulation-based laser measuring device, and the triangulation-based laser measuring device can not directly emit the laser light to the surface of the object, thus limiting the use of the triangulation-based laser measuring. As a compromise, other laser distance measuring techniques are generally used, which greatly reduces the measuring accuracy, and is also difficult to ensure the testing speed.

Fluorescence microscopic analysis devices are widely used in the field of biological cell analysis. The fluorescence microscopic analysis devices are constantly developing in intelligence, automation, integration, and high efficiency.

A basic principle of the fluorescence microscopic analysis devices is: emitting rays of various spectral lines by a fluorescent light source; allowing only an ultraviolet ray with a specific wavelength to through an excitation filter; and exciting a sample to generate fluorescence after the ultraviolet ray with the specific wavelength passes through a reflecting mirror. Typically, the fluorescence generated by excitation is visible light and has a wavelength much longer than the wavelength of the ray that excites the sample. The fluorescence generated in this way and a part of target fluorescence excitation rays that pass through the sample are imaged by the objective lens, and the fluorescence image can be observed by humans or cameras using an eyepiece. However, the fluorescence microscopic analysis devices still have several issues, mainly including: 1) requiring manual focusing by an operator; 2) requiring the operator to manually adjust the fluorescence light source to obtain target fluoroscene excitation light with the specific wavelength to excite the sample to be measured for fluorescence emission; 3) when a plurality of samples to be measured are observed and analyzed, requiring the operator to manually replace and place the samples to be measured in an observation position;

4) for each sample is observed, requiring the operator to manually refocus; 5) when there are significant differences between the samples, requiring the operator to readjust a magnification, refocus, and adjust the fluorescence light source, making the operations complex and including repetitive steps. As a result, the work efficiency is low, the flexibility of use is poor, the level of automation is low, and the operations are time-consuming and laborious.

SUMMARY

The present disclosure provides a method for laser distance measuring with high measuring accuracy and low time consumption, which can be applied to indirect distance measurement in a confined space.

A method for laser distance measuring includes:
emitting an incident ray α having an incident angle δ to a reflective surface of a laser reflecting mirror, the incident ray α being reflected by the laser reflecting mirror to generate a first reflected ray β, and the first reflected ray β irradiating an object to be measured;
capturing a second reflected ray θ and generating a laser image on a laser imaging plane, the second reflected ray θ being generated by the reflective surface of the laser reflecting mirror reflecting a return ray γ generated after the first reflected ray β irradiates a surface of the object to be measured; and
determining, based on the laser image, a measurement distance A according to a geometrical trigonometry; wherein
a height of a base of a triangle is equal to the measurement distance A. The base of the triangle is a connection line L of an emitting point of the incident ray α and a receiving point of the second reflected ray θ, and a vertex angle of the triangle is an intersection angle of the incident ray α and an extension line of the second reflected ray θ.

In some embodiments, an included angle F between the connection line L of the emitting point of the incident ray α and the receiving point of the second reflected ray θ and the incident ray α is a known constant, and an included angle between the connection line L and the second reflected ray θ is ζ; wherein $$\zeta = \arcsin(X/(X^2+Y^2)^{1/2}); \text{ where}$$

X represents a distance between the receiving point and the laser imaging plane; and Y represents a distance between a vertical line passing through the receiving point and perpendicular to the laser imaging plane and a laser image generated by the second reflected ray θ on the laser imaging plane.

In some embodiments, the object to be measured includes a transparent slide. The transparent slide includes an upper surface and a lower surface, and a thickness of the transparent slide is equal to a difference between a measurement distance $A_u$ corresponding to the upper surface and a measurement distance $A_l$ corresponding to the lower surface.

In some embodiments, a flatness of the transparent slide is determined based on thicknesses at different positions of the transparent slide.

The present disclosure also provides a focusing method with high measuring accuracy and low time consumption. The focusing method adopts the method for laser distance measuring which makes the arrangement of triangulation-based laser distance measuring related devices more flexible through the laser reflecting mirror, and can be applied in an indirect distance measuring in a confined space to assist in the focusing of an objective lens.

The focusing method including:
determining a target object distance $C_0$;
determining the measurement distance A, the laser reflecting mirror being arranged between an objective lens and an object to be measured, and the measurement distance A being determined based on the above-mentioned method for laser distance measuring;
obtaining a second distance $C_2$ between the objective lens and the laser reflecting mirror along an axial direction of the objective lens, and obtaining, based on the measurement distance A and a distance conversion formula, a first distance $C_1$ between the laser reflecting mirror and the object to be measured along the axial direction of the objective lens;
determining an actual distance C between the object to be measured and the objective lens based on the first distance $C_1$ and the second distance $C_2$; and
adjusting the actual distance C between the objective lens and the object to be measured to be equal to the target object distance $C_0$.

In some embodiments, the object to be measured includes a sample, and when the first reflected ray β directly irradiates a surface of the sample, the actual distance between the object to be measured and the objective lens is $C=C_1+C_2$, and the distance conversion formula is:

$$A=D+C_1; \text{ where}$$

the first reflected ray β and the return ray γ are coaxial or parallel to an axis of the objective lens with respect to a normal line of the object to be measured, D represents a distance from an intersection of the height of the base of the triangle and the laser reflecting mirror to the base of the triangle, and the base of the triangle is the connection line L of the emitting point of the incident ray α and the receiving point of the second reflected ray θ and the vertex angle of the triangle is the intersection angle of the incident ray α and the extension line of the second reflected ray θ.

In some embodiments, the object to be measured includes a sample and a transparent slide, and when the first reflected ray β passes through the transparent slide and irradiates a surface of the sample, the actual distance between the object to be measured and the objective lens is $C=C_1+C_2+C_3$, and the distance conversion formula is:

$$A=D+C_1; \text{ where}$$

the first reflected ray β and the return ray γ are coaxial or parallel to an axis of the objective lens with respect to a normal line of the object to be measured, $C_3$ represents a thickness of the transparent slide, D represents a distance from an intersection of the height of the base of the triangle and the laser reflecting mirror to the base of the triangle, and the base of the triangle is the connection line L of the emitting point of the incident ray α and the receiving point of the second reflected ray θ, and the vertex angle of the triangle is the intersection angle of the incident ray α and the extension line of the second reflected ray θ.

The present disclosure also provides a system for laser distance measuring, which has high measuring accuracy and low time consumption, and can be applied to indirect distance measuring in a confined space.

The system for laser distance measuring, applying the above-mentioned method for laser distance measuring, including:

a laser reflecting mirror;
a laser emitting part configured to emit an incident ray α having an incident angle δ to a reflective surface of the laser reflecting mirror, a first reflected ray β being generated by the incident ray α being reflected, and a return ray γ being generated by the first reflected ray β irradiating a surface of the object to be measured;
a laser receiving part configured to receive a second reflected ray θ generated by the reflective surface of the laser reflecting mirror reflecting the return ray γ, and generate a laser image; and
a calculation module configured to determine a measurement distance A based on a geometrical trigonometry and the laser image.

In some embodiments, the laser receiving part includes:
a laser imaging plane parallel to a connection line L of an emitting point of the incident ray α and a receiving point of the second reflected ray θ;
a receiving lens configured to receive the second reflected ray θ and project the second reflected ray θ on the laser imaging plane, the second reflected ray θ and the laser imaging plane having an included angle ζ, and an included angle F between the connection line L of the emitting point of the incident ray α and the receiving point of the second reflected ray θ and the incident ray α being a known constant; wherein $$\zeta = \arcsin(X/(X^2+Y^2)^{1/2}); \text{ where}$$

X represents a distance between the receiving point and the laser imaging plane; and Y represents a distance between a vertical line passing through the receiving point and perpendicular to the laser imaging plane and the laser image generated by the second reflected ray θ on the laser imaging plane.

The present disclosure also provides a focusing system with high measuring accuracy and low time consumption. The method for laser distance measuring applied by the focusing system can make the arrangement of the triangulation-based laser distance measuring related devices more flexible through the laser reflecting mirror, and can be applied in indirect distance measuring in a confined space to assist in the focusing of the objective lens.

The focusing system, applying the above-mentioned focusing method, includes:
the system for laser distance measuring as described above;
a focus displacement component;
the objective lens, arranged on the focus displacement component, the focus displacement component being configured to move the objective lens along the axial direction of the objective lens relative to the object to be measured for auto-focusing.

In some embodiments, the laser reflecting mirror of the system for laser distance measuring includes a semi-transmissive and semi-reflective mirror.

In some embodiments, the first reflected ray β and the return ray γ are coaxial with an axis of the objective lens with respect to the normal of the object to be measured.

In some embodiments, the laser reflecting mirror of the system for laser distance measuring is arranged at an avoidance position on a side of the objective lens close to the object to be measured, to avoid the objective lens.

The focusing system further includes:
a carrier on which the object to be measured is placed; and
a translation component drivingly connected to the carrier, and configured to drive the carrier to move, such that the object to be measured on the carrier optionally moves to a distance measuring station or an observation station, wherein along the axial direction of the objective lens, the distance measurement station faces the laser reflecting mirror, the observation station faces the objective lens, and the distance measuring station and the observation station are located in a plane perpendicular to the axis of the objective lens; wherein when the object to be measured is located at the distance measuring station, the focusing system is configured to measure and obtain the measurement distance A, and when the object to be measured is located at the observation station, the focusing system is configured to auto-focus, or obtain the measurement distance A and auto-focus In some embodiments, the focusing system further includes:
a control module electrically connected with the laser emitting part of the system for laser distance measuring, the laser receiving part of the system for laser distance measuring, the focus displacement component, and the calculation module of the system for laser distance measuring, and configured to obtain a target object distance $C_0$ and the measurement distance A, and determine the actual distance C between the object to be measured and the objective lens, to control the movement of the focus displacement component, such that the actual distance C between the objective lens and the object to be measured can be equal to the target object distance $C_0$.

In some embodiments, the laser reflecting mirror of the system for laser distance measuring is inclined at 45 degrees to a horizontal plane, and the incident ray α is located in the horizontal plane.

In some embodiments, a thickness of the laser reflecting mirror of the system for laser distance measuring is 650 nm, and a wavelength of the incident ray α is 655 nm.

In some embodiments, the focusing system further includes:
a tube lens arranged coaxially with the objective lense and on a side of the objective lens away from the laser reflecting mirror; and
a camera arranged at an end of the tube lens away from the objective lens, and configured to photograph the object to be measured through the objective lens and the tube lens.

In some embodiments, the focusing system further includes:
a bright field light source arranged on a side of the laser reflecting mirror of the system for laser distance measuring facing the object to be measured, the object to be measured being located between the bright field light source and the laser reflecting mirror, and the bright field light source being configured to generate a bright field ray.

In some embodiments, the object to be measured includes a sample and a transparent slide, and the sample is carried on the transparent slide.

The focusing system further includes:
a carrier, the transparent slide being placed on the carrier, a ray-transmitting hole being opened on the carrier, and the first reflected ray β passes through the ray-transmitting hole, irradiates a lower surface of the transparent slide, and is reflected by the lower surface of the transparent slide to generate the return ray γ.

In some embodiments, the object to be measured includes a sample and a transparent slide, the sample being carried on the transparent slide.

The focusing system further includes:
a carrier, the transparent slide being placed on the carrier, the first reflected ray β directly irradiating an upper surface of the sample, and reflected by the upper surface of the sample to generate the return ray γ.

The present disclosure also provides a device for auto-focusing analysis, which can realize efficient auto-focusing analysis and has the advantages of high automation level, simple and convenient operation, and high work efficiency.

The device for auto-focusing analysis includes:
a loading mechanism configured to carry a sample carrier plate, the sample carrier plate being provided with at least two carrying positions configured to carry samples, and the loading mechanism being further configured to drive the sample carrier plate to translate along at least one direction, such that the carrying positions on the sample carrier plate are sequentially located at an observation position;
a microscopic imaging mechanism configured to sequentially obtain microscopic imaging of each of the samples at the carrying positions when the sample is located at the observation position;
an auto-focusing mechanism drivingly connected with the microscopic imaging mechanism, and configured to adjust an object distance C between an objective lens of the microscopic imaging mechanism and the sample at the observation position based on a triangular laser distance measuring technique before obtaining the microscopic imaging to make an object image clear; and
a light source mechanism configured to provide a light source for the sample that is at the observation position.

In some embodiments, the auto-focusing mechanism includes:
a laser reflecting mirror fixed between the objective lens and the sample at the observed position;
a triangular laser rangefinder configured to emit an incident ray α having an incident angle δ to a reflective surface of the laser reflecting mirror, a first reflected ray β being generated by the incident ray α being reflected, a return ray γ being generated the first reflected ray β irradiating a surface of the sample, a second reflected ray θ being generated by by the reflective surface reflecting the return ray γ, and the triangular laser rangefinder also configured to receive the second reflected ray θ, generate a laser image, and determine a measurement distance A based on the geometrical trigonometry and the laser image; and
a focus displacement component, the objective lens being arranged at an output end of the focus displacement component, and the focus displacement component being configured to adjust the object distance C to make the object distance C equal to a target object distance C0; wherein
a height of a base of a triangle may be equal to the measurement distance A, the base of the triangle being a connection line L of an emitting point of the incident ray α and a receiving point of the second reflected ray θ, and a vertex angle of the triangle being an intersection angle of the incident ray α and an extension line of the second reflected ray θ as a vertex angle.

In some embodiments, the focus displacement component is further configured to, after adjusting the object distance C of the sample at a reference carrying position to the target object distance $C_0$, adjust the object distance C of a sample at a remaining carrying position to the target object distance $C_0$ based on the measurement distance A corresponding to the reference carrying position and measurement distances A corresponding to the remaining carrying position.

In some embodiments, the laser reflecting mirror includes a semi-transmissive and semi-reflective mirror, and the first reflected ray β and the return ray γ are coaxial with an axis of the objective lens with respect to a normal line of the sample.

In some embodiments, the light source mechanism includes:
a fluorescent component, including a fluorescent light source and at least two filter cubes, the fluorescent light source being configured to provide a target fluorescence excitation ray to the sample that is at the observation position through one of the at least two filter cubes.

In an embodiment, the focus displacement component is further configured to correct a deviation of the object distance C based on at least one of the target fluorescence excitation ray or one of the at least two filter cubes.

In some embodiments, the light source mechanism further includes:
a filter automatic switching component drivingly connected with the at least two filter cubes, and configured to enable one of the at least two filter cubes to cooperate with the fluorescent light source to provide the sample that is at the observation position with the target fluorescent excitation ray.

In some embodiments, the filter automatic switching component includes:
a filter carrier plate provided with at least two fixing positions for fixing the at least two filter tubes, each of the at least two filter cubes being fixed at one of the at least two fixing positions; and
a carrier displacement component, the filter carrier plate being arranged at an output end of the carrier displacement component, and the carrier displacement component being configured to drive the filter carrier plate to move such that one of the at least two filter cubes can move to a docking position, and cooperate with the fluorescent light source to provide the sample that is at the observation position with the target fluorescent excitation ray.

In some embodiments, the light source mechanism includes:
a bright field light source arranged above the loading mechanism, and configured to provide the sample that is at the observation position with a bright field ray.

In some embodiments, the loading mechanism includes:
a carrier configured to carry the sample carrier plate; and
a translation component configured to carry the carrier and automatically translate the carrier, such that one of the samples at the at least two carrying positions is transported to the observation position.

In some embodiments, the translation component includes:
a frame;
a first displacement driving part arranged on the frame; and
a second displacement driving part arranged at an output end of the first displacement driving part, the first displacement driving part being configured to drive the second displacement driving part along a first direction, the carrier being fixed at an output end of the second displacement driving part, and the second displacement driving part being configured to drive the carrier to move along a second direction, and the first direction being perpendicular to the second direction.

In some embodiments, a count of the objective lenses is at least two, and the microscopic imaging mechanism further includes:

an objective lens switching component, the at least two objective lenses being fixed at an output end of the objective lens switching component, and the objective lens switching component being configured to optionally drive one object lens of the at least two objective lenses to directly face the sample that is at the observation position.

In some embodiments, the microscopic imaging mechanism further includes:

a tube lens arranged coaxially with the objective lens and on a side of the objective lens away from the observation position; and a camera arranged on a side of the tube lens away from the objective lens, and configured to obtain microscopic imaging.

The present disclosure also proposes a system for auto-focusing analysis, which can realize high-efficiency auto-focusing, and has the advantages of high automation level, simple and convenient operation, and high work efficiency.

A system for auto-focusing analysis, including the device for auto-focusing analysis described above, and a master control mechanism, the master control mechanism including:

a storage module configured to store microscopic analysis execution strategies for analyzing the samples;

an execution module configured to control a translation component according to the microscopic analysis execution strategies, such that the samples at the at least two carrying positions are sequentially transported to the observation positions in a preset order; control a filter automatic switching component, such that one filter cube of at least two filter cubes cooperates with a fluorescence light source to provide the sample that is at the observation position with a target fluorescence excitation ray; and control the auto-focusing mechanism to adjust the object distance C to a target object distance $C_O$, such that the microscopic imaging mechanism obtains the microscopic imaging.

The present disclosure also provides a method for auto-focusing analysis, which can realize high-efficiency auto-focusing.

A method for auto-focusing analysis, applied to the device for auto-focusing analysis as described above, including:

determining a carrying position to be analyzed on the loading mechanism, and transporting the sample carried on the carrying position to be analyzed to the observation position;

providing the sample that is at the observation position with the light source through the light source mechanism;

adjusting the object distance C between the objective lens and the sample at the observation position based on the triangular laser distance measuring technique to make the object image clear; and obtaining a microscopic imaging of the sample that is at the observation position through the microscopic imaging mechanism.

In some embodiments, in a case of adjusting the object distance C between the objective lens and the sample that is at the observation position based on the triangular laser distance measuring technique, in a case of adjusting the object distance C between the objective lens and the sample that is at the observation position based on the triangular laser distance measuring technique, In some embodiments, the light source provided by the light source mechanism includes a fluorescent light source; and the providing the sample that is at the observation position with the light source through the light source mechanism includes:

determining a filter cube from at least two filter cubes, wherein the fluorescent light source provides the sample that is at the observation position with the target fluorescence excitation ray after being filtered by the filter cube.

In some embodiments, the correcting a deviation of the object distance C is performed based on at least one of the target fluorescence excitation ray or the filter cube determined from the at least two filter cubes.

Figure 1:
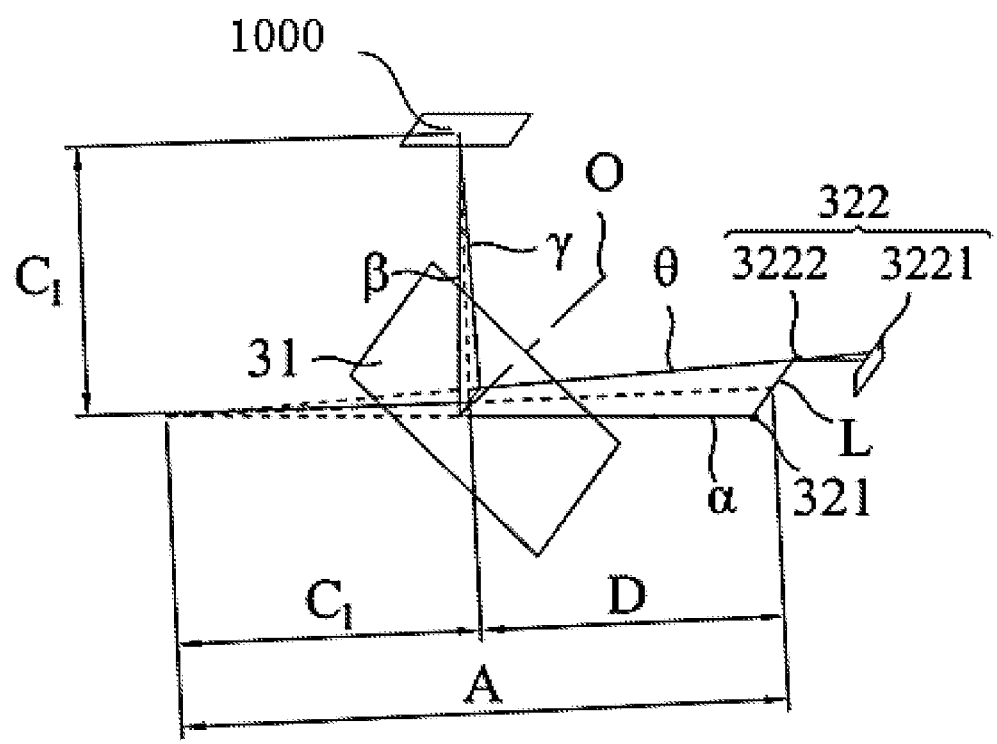
FIG. 1 is a three-dimensional schematic diagram of a method for laser distance measuring according to some embodiments of the present disclosure.

M, First direction; N, Second direction; O, Normal line;
1000, Object to be measured;
100, Sample carrier plate;
1. Loading mechanism; 11. Carrier; 12. Translation component; 121. Frame; 1211. Top plate; 122. First displacement driving part; 123. Second displacement driving part; 124. Middle carrying plate; 125. Bright field light source carrier plate;

2. Microscopic imaging mechanism; 21. Objective lens; 22. Objective lens switching component; 23. Tube mirror; 24. Camera;
3. Auto-focusing mechanism; 31. Laser mirror; 32. Triangular laser rangefinder; 321. Laser emitting part; 322. Laser receiving part; 3221. Laser imaging plane; 3222. Receiving lens; 33. Focus displacement component;
4. Fluorescent component; 41. Fluorescent light source; 42. Filter cube;
5. Filter automatic switching component; 51. Filter carrier plate; 52. Carrier plate displacement component;
6. Bright field light source;
7. Master control mechanism; 71. Storage module; 72. Execution module;
8. Control module.

DETAILED DESCRIPTION

The technical solution of the present disclosure will be described below in conjunction with the accompanying drawings and by means of specific embodiments.

In the description of the present disclosure, unless otherwise specified and limited, the terms "connected," "connected," and "fixed" should be interpreted in a broad sense, for example, they may denote a fixed connection, a detachable connection, or an integral body; they may denote mechanically or electrically connected; and they may denote directly connected or indirectly connected through an intermediary, an internal communication of two elements, or an interaction relationship between two elements. Those of ordinary skill in the art may understand the meanings of the above terms in the present disclosure according to situations.

In the present disclosure, unless otherwise specified and limited, a first feature being "on" or "under" a second feature may include that the first and second features are in direct contact, or in contact through an additional feature. Moreover, the first feature being "above," "over," and "on top of" the second feature may include that the first feature is directly above and obliquely above the second feature, or simply means that the first feature is horizontally higher than the second feature. The first feature being "below," "beneath," and "under" the second feature may include that the first feature is directly below and obliquely below the second feature, or simply means that the first feature has a lower level than the second feature.

In the descriptions of the embodiments, the terms "up," "down," "left," "right," and other orientations or positional relationships based on the orientations or positional relationships shown in the drawings, and are only for the convenience of description and simplification of operations. It is not intended to indicate or imply that the device or element referred to must have a particular orientation, be constructed, or operate in a particular orientation, and thus should not be construed as limiting the present disclosure. In addition, the terms "first" and "second" are only used to distinguish in descriptions, and have no special meaning.

As shown in FIGS. 1-4, the embodiment provides a method for laser distance measuring that allows for bending changes in a laser path without affecting distance measurement. The method has high accuracy and low time consumption, making it suitable for indirect distance measuring in a confined space. The method for laser distance measuring can assist in achieving objective focusing in a focusing method and is applicable for real-time measuring of object distance during objective focusing in microscopic devices. At the same time, a focusing method based on the method for laser distance measuring, a system for laser distance measuring applying the method for laser distance measuring, and a focusing system applying the focusing method and including the system for laser distance measuring are also provided.

As shown in FIGS. 1-5, in the embodiment, the system for laser distance measuring includes a laser reflecting mirror 31, a laser emitting part 321, a laser receiving part 322, and a calculation module 10. In the embodiment, the laser emitting part 321 and the laser receiving part 322 belong to an internal structure of a triangular laser rangefinder 32 according to a principle of triangulation-based laser distance measuring, and the triangular laser rangefinder 32 is a device for triangulation-based laser distance measuring. In the system for laser distance measuring, the laser emitting part 321 is configured to emit an incident ray α having an incident angle δ to a reflective surface of the laser reflecting mirror 31. The incident ray α is reflected to generate a reflected ray 3. A return ray 7 may be generated by the first reflected ray β irradiating a surface of an object 1000 to be measured. The laser receiving part 322 is configured to receive a second reflected ray θ generated by the reflective surface of the laser reflecting mirror 31 reflecting the return ray γ, and generate a laser image.

Figure 2:
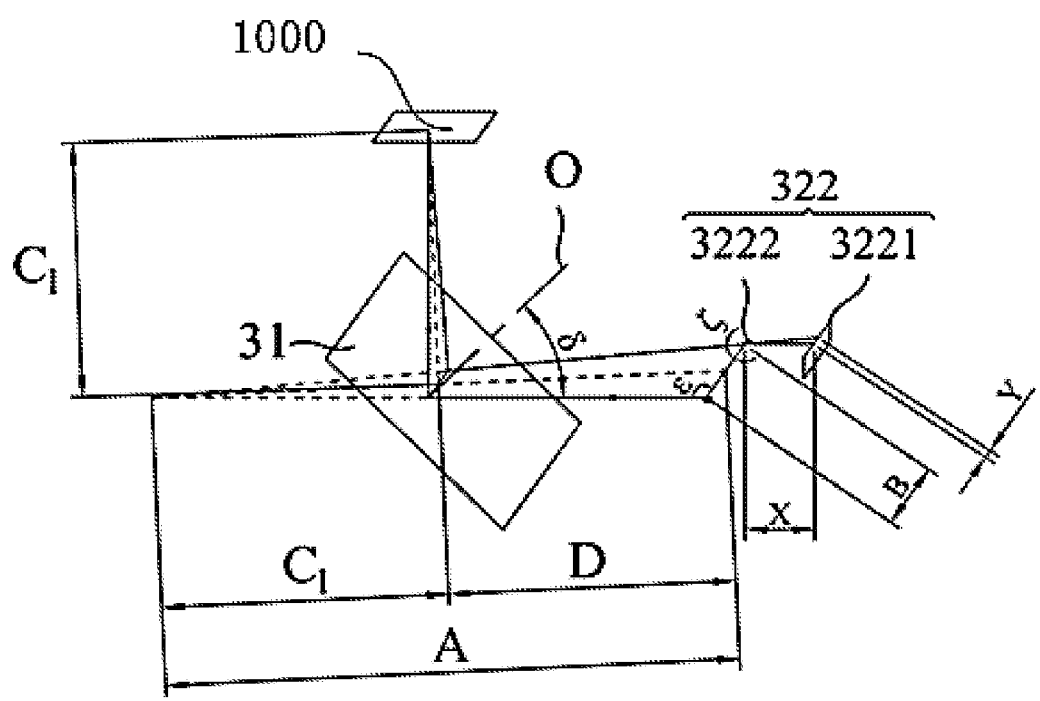
FIG. 2 is a three-dimensional schematic diagram of another method for laser distance measuring according to some embodiments of the present disclosure.

As shown in FIGS. 1-2, in the embodiment, the laser receiving part 322 includes a laser imaging plane 3221 and a receiving lens 3222. The laser imaging plane 3221 is parallel to a connection line L of an emitting point of the incident ray α and a receiving point of the second reflected ray θ. The receiving lens 3222 is configured to receive the second reflected ray θ, and project the second reflected ray θ on the laser imaging plane 3221. The second reflected ray θ and the laser imaging plane 3221 have an included angle ζ. An included angle F between the connection line L of the emitting point of the incident ray α and the receiving point of the second reflected ray θ and the incident ray α is a known constant; where $\zeta=\arcsin(X/(X^2+Y^2)^{1/2})$. The calculation module 10 is configured to determine a measurement distance A based on a geometrical trigonometry and the laser image. In the embodiment, the formula for calculating the measuring distance A for the triangular laser rangefinder 32 is: A=B/2*X/Y. A height of a base of a triangle is equal to the measurement distance A, wherein the base of the triangle is the connection line L of the emitting point of the incident ray α and the receiving point of the second reflected ray θ and a vertex angle of the triangle is an intersection angle of the incident ray α and an extension line of the second reflected ray θ. B represents a distance between the emitting point of the incident ray α and the receiving point of the second reflected ray θ. In the embodiment, as shown in FIGS. 1-2, a triangle formed by connecting an emitting point of the laser emitting part 321 (i.e., the emitting point of the incident ray α), a receiving point of the laser receiving part 322 (i.e., the receiving point of the second reflected ray θ), and a mirror-symmetric imaging point of the object to be measured 1000 in the laser reflecting mirror 31 (i.e., a vertex of the vertex angle formed by the incident ray α and the extensions line of the second reflected ray θ, not shown in the figure) is an isosceles triangle. A length of the connection line L of the emitting point of the laser emitting part 321 and the receiving point of the laser receiving part 322 is B.

X represents a distance between the receiving point and the laser imaging plane 3221; and Y represents a distance between a vertical line passing through the receiving point and perpendicular to the laser imaging plane 3221 and the laser image generated by the second reflected ray θ on the laser imaging plane 3221. Therefore, under a premise that the triangle is the isosceles triangle, A=B/2*X/Y.

In the embodiment, the laser imaging plane 3221 is parallel to the connection line L of the emitting point of the incident ray α and the receiving point of the second reflected ray θ. At the same time, the first reflected ray β generated by a reflection of the incident ray α on the laser reflecting mirror 31, the return ray γ generated by a reflection of the first reflected ray β on the object 1000 to be measured, and the second reflected ray θ generated by a reflective surface of the laser reflecting mirror 31 reflecting the return ray γ all follow the principle of mirror reflection of light (i.e., an incident angle is equal to a reflection angle). Therefore, the mirror-symmetrical imaging point of the object 1000 to be measured in the laser reflecting mirror 31 and the point where the first reflected light R irradiates on the object 1000 to be measured have a mirror-symmetric imaging relationship with respect to the laser reflecting mirror 31. The emitting point of the incident ray α, the receiving point of the second reflected ray θ, and the intersection point of the incident ray α and the extension line of the second reflected ray θ are sequentially connected to form an isosceles triangle, and the aforementioned base of the isosceles triangle is the connection line L of the emitting point of the incident ray α and the receiving point of the second reflected ray θ. A length of the height of the base is equal to a sum of a distance from a point of reflection of the first reflection ray β on the object 1000 to be measured along the first reflection ray β and the return ray γ with respect to a direction of a normal line of the object 1000 to be measured plus a distance from an intersection of the normal line and the laser reflecting mirror 31 to a midpoint of the connection line L. The height of the aforementioned base of the isosceles triangle divides the isosceles triangle into two right-angled triangles, and both the aforementioned triangle and a triangle formed by the receiving point, an intersection point obtained by making a vertical line perpendicular to the laser imaging plane 3221 through the receiving point, and an intersection point obtained by making a vertical line perpendicular to the laser imaging plane 3221 through the receiving point obey the geometrical trigonometry.

Therefore, when the distance between the receiving point and the laser imaging plane 3221 (i.e., X), the distance between the vertical line passing through the receiving point and perpendicular to the laser imaging plane 3221 and the laser image generated by the second reflected ray θ on the laser imaging plane 3221 (i.e., Y), the length of the connection line L of the emitting point of the laser emitting part 321 and the receiving point of the laser receiving part 322 (i.e., B) are known, the measurement distance A may be calculated according to the geometrical trigonometry: A=B/2*X/Y. Further, according to different distance measuring requirements, the measurement distance A may be applied to actual ranging distance measuring scenarios.

In the embodiment, the aforementioned triangle is the isosceles triangle, the first reflected ray β generated by the reflection of the incident ray α on the laser reflecting mirror 31, the return ray γ generated by the reflection of the first reflected ray β on the object 1000 to be measured, and the second reflected ray θ generated by the reflection of the return ray γ by the laser reflecting mirror 31 all obey a principle of mirror reflection of light (i.e., an incident angle is equal to a reflection angle). In other embodiments, the aforementioned triangle may not be the isosceles triangle, and the return ray γ may also be a diffusely reflected ray of the first reflected ray β, that is, the incidence angle is not equal to the reflection angle. In this case, the measurement distance A may still be calculated according to the geometrical trigonometry, and the calculation formula is a conventional calculation formula, so it will not be repeated here.

In addition, according to the geometrical trigonometry, as mentioned above, when the included angle between the second reflected ray θ and the laser imaging plane 3221 is known to be ζ, the included angle between the connection line L of the emitting point of the incident ray α and the receiving point of the second reflected ray θ and the incident ray α is known to be P, and length of the connection line L of the emitting point of the laser emitting part 321 and the receiving point of the laser receiving part 322 is known to be B, that is, when two angles and one side are known, the measurement distance A may also be calculated according to the geometrical trigonometry, and may not necessarily need to be calculated using A=B/2*X/Y in the embodiment. Since the calculation process is a conventional calculation, it is not repeated here.

The system for laser distance measuring and the method for laser distance measuring of the embodiment adopt the laser reflecting mirror 31 to make the incident ray α be reflected by the laser reflecting mirror 31 to irradiate the surface of the object 1000 to be measured, and the return ray γ is reflected by the laser reflecting mirror 31 to be captured by the laser receiving part 322, which realizes the bending change of the laser ray path, making the position arrangement of the laser emitting part 321 and the laser receiving part 322 more flexible. According to the principle of mirror imaging and reflection, although the laser reflecting mirror bends the laser ray path, it does not affect the distance measurement through the geometrical trigonometry, and the indirect distance measuring calculation may still be performed through the geometrical trigonometry. The method has high measuring accuracy and low time consumption, and is suitable for indirect distance measuring in a confined space with wide application prospects.

The embodiment also provides a method and system for measuring a thickness of a transparent slide based on the method for laser distance measuring of the embodiment. The transparent slide includes an upper surface and a lower surface, both of which may respectively reflect the first reflected ray β, and then form two ray spots on the laser imaging plane 3221. The triangular laser rangefinder 32 may respectively obtain a measurement distance $A_u$ corresponding to the upper surface and a measurement distance $A_l$ corresponding to the lower surface based on the two ray spots. The thickness of the transparent slide is equal to a difference between the measurement distance $A_u$ corresponding to the upper surface and the measurement distance $A_l$ corresponding to the lower surface. Thicknesses of different positions of the transparent slide may be measured to determine a flatness of the transparent slide. By applying the method or system for measuring the thickness of the transparent slide, transparent slides with better flatness may be screened for microscopic observation of samples, and the quality of microscopic images may be improved.

The method for laser distance measuring of the present disclosure no longer directly emits laser ray to the surface of the object to be measured, but generates the incident ray α through the reflection of the laser reflecting mirror, so that the first reflected ray β irradiates the object to be measured, and the received second reflected ray θ is generated by a reflective surface of the laser reflecting mirror reflecting the return ray γ generated after the first reflected ray β irradiates the surface of the object to be measured. The principle of mirror imaging and the geometrical trigonometry are skillfully used to achieve indirect distance measuring of the object to be measured. Here, the measurement distance A obtained according to the geometrical trigonometry is actually the length of the height of the base of the triangle. The base of the triangle is the connection line L of the emitting point of the incident ray α and the receiving point of the second reflected ray θ and the vertex angle of the triangle is the intersection angle of the incident ray α and the extension line of the second reflected ray θ. The advantages of the method lie in high measuring accuracy and low time consumption, and the arrangement of related devices for triangulation-based distance measuring is more flexible thanks to the use of the laser reflecting mirror, which enables indirect distance measuring in a confined space.

The laser emitting part of the system for laser distance measuring of the present disclosure emits the incident ray α having the incident angle δ to the reflective surface of the laser reflecting mirror, the incident ray α is reflected to generate the first reflected ray β, and the first reflected ray β irradiates the surface of the object to be measured to generate the return ray γ. The laser receiving part receives the second reflected ray θ generated by the reflective surface of the laser reflecting mirror reflecting the return ray γ, and generates the laser image. The calculation module determines the measurement distance A based on the geometrical trigonometry and the laser image.

In the present disclosure, by adding the laser reflecting mirror, the incident ray α is reflected by the laser reflecting mirror to irradiate the surface of the object to be measured, and the return ray γ is reflected by the laser reflecting mirror and captured by the laser receiving part, which realizes the bending of the laser ray path, thus making the position arrangement of the laser emitting part and the laser receiving part more flexible. In addition, according to the principle of mirror imaging and reflection, although the laser reflecting mirror bends the laser ray path, it does not affect the distance measuring according to the geometrical trigonometry, and the distance measuring calculation can still be performed in a similar way according to the geometrical trigonometry. The method has high measuring accuracy, low time consumption, and makes the arrangement of the triangulation-based laser distance measuring related devices more flexible through the laser reflecting mirror, and can be applied in indirect distance measuring in a confined space.

The embodiment also provides a focusing method based on the method for laser distance measuring of the embodiment and a corresponding focusing system. As shown in FIGS. 1-5, in the embodiment, the focusing method is based on the method for laser distance measuring of the embodiment, which includes the following steps.

Figure 3:
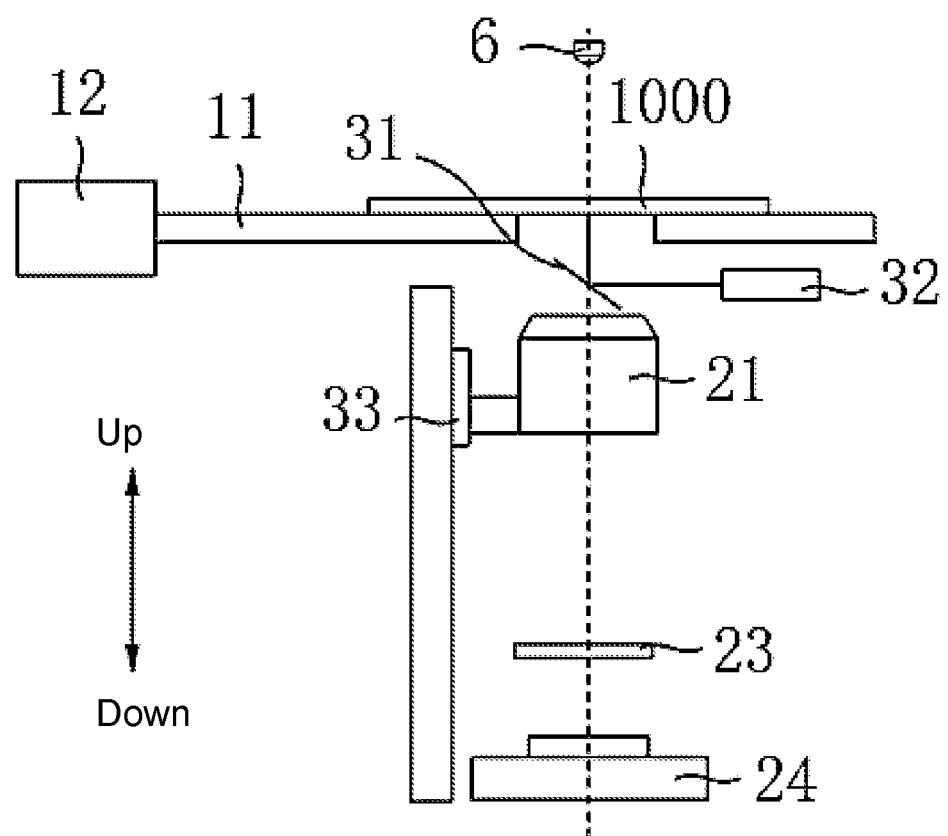
FIG. 3 is a schematic structural diagram of a focusing system according to some embodiments of the present disclosure.
Figure 4:
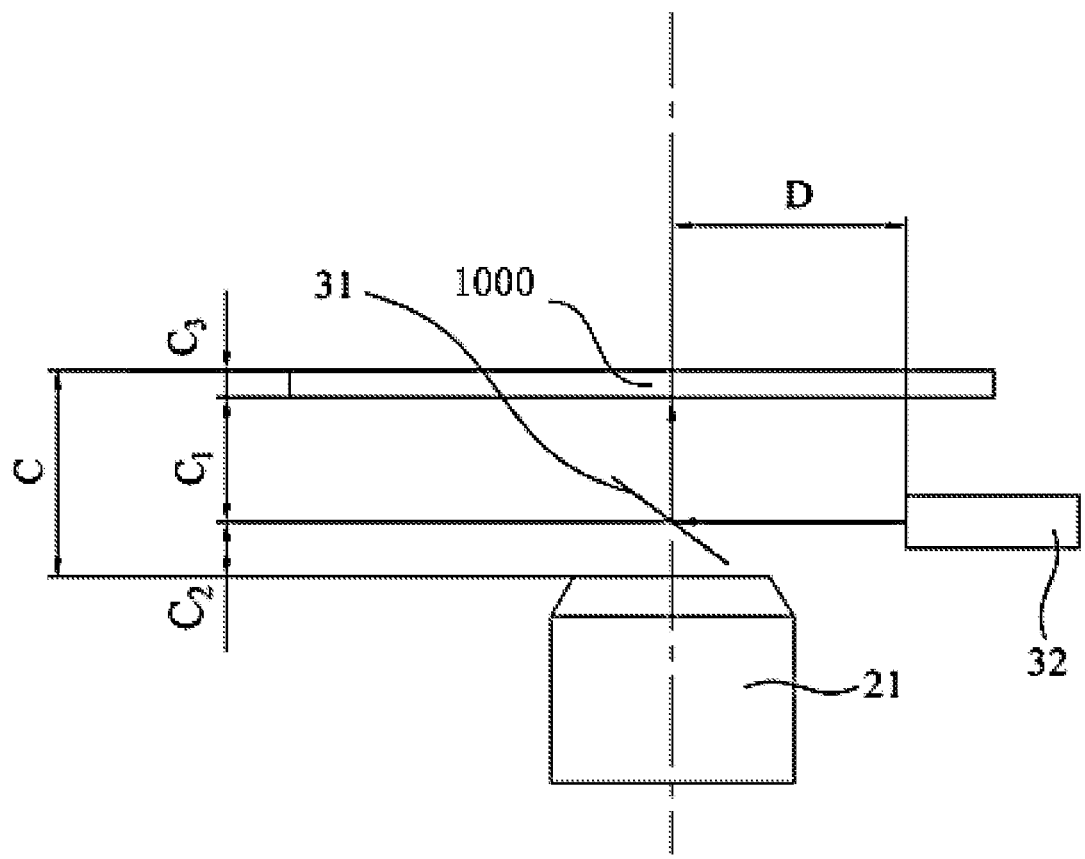
FIG. 4 is a schematic diagram of a distance relationship during auto-focusing of a focusing system according to some embodiments of the present disclosure.
Figure 5:
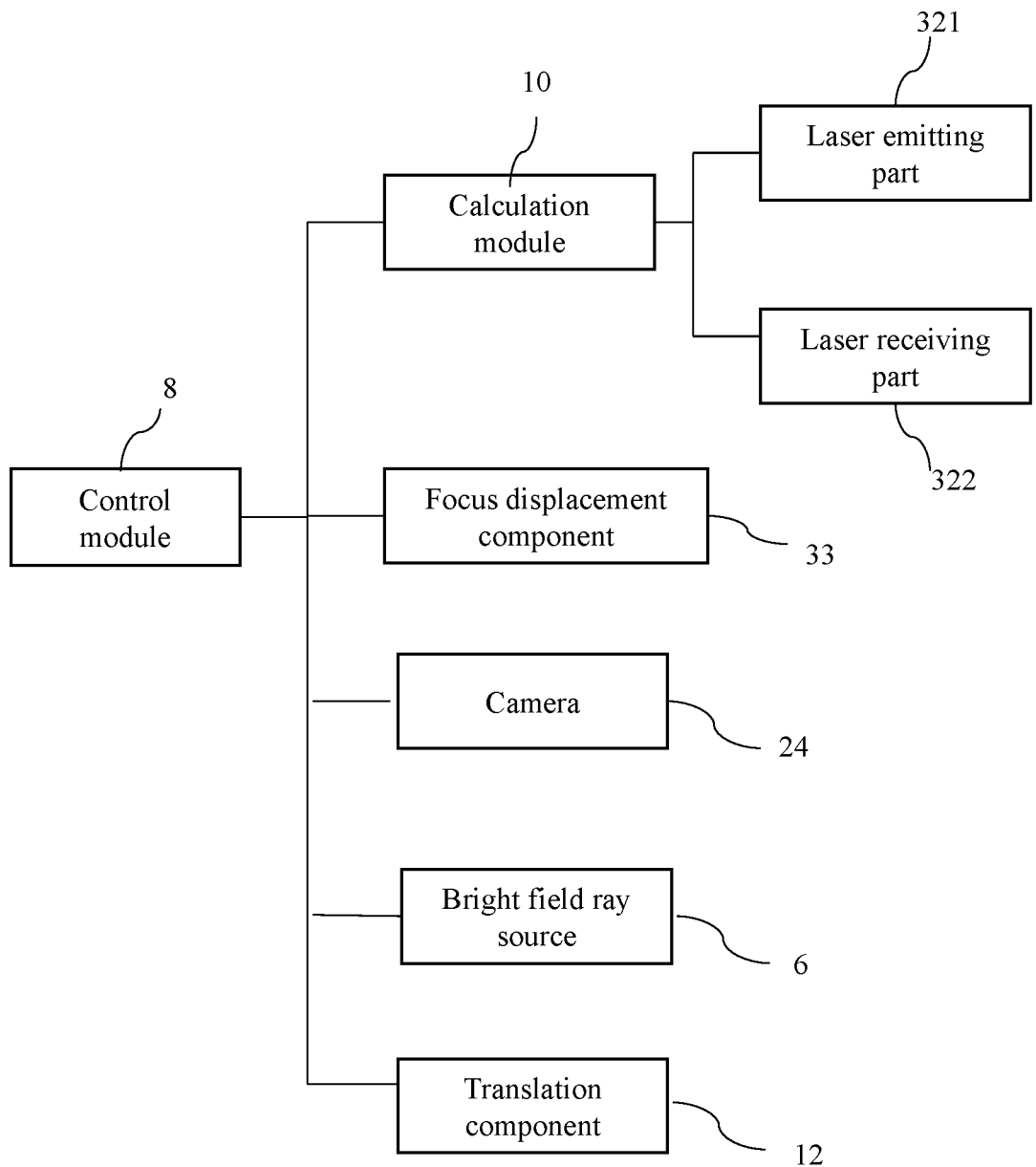
FIG. 5 is a schematic circuit diagram of a focusing system according to some embodiments of the present disclosure.

First, a target-object distance $C_0$ is determined. The target-object distance is a focal length of the objective lens 21. As shown in FIGS. 3-5, the objective lens 21 is vertically arranged directly below the object 1000 to be measured.

Then, the measurement distance A is determined. The laser reflecting mirror 31 is arranged between the objective lens 21 and the object 1000 to be measured, and faces the objective lens 21 along the axial direction of the objective lens 21. The method for determining the measurement distance A is as described above in the description of the method for laser distance measuring, and will not be repeated here.

Then, a second distance $C_2$ between the objective lens 21 and the laser reflection mirror 31 along an axial direction of the objective lens 21 is obtained, and a first distance $C_1$ between the laser reflection mirror 31 and the object 1000 to be measured along the axial direction of the objective lens 21 is obtained based on the measurement distance A and a distance conversion formula. The second distance $C_2$ is a numerical value that may be obtained according to an actual position of the objective lens 21. A moving distance of the objective lens 21 along a vertical direction may be measured and determined by a grating ruler, and when the objective lens 21 is positioned at an initial position, the distance between the objective lens 21 and the laser reflecting mirror 31 along the axial direction of the objective lens 21 is calibrated as an initial known measurement value. Then a current distance (i.e., the second distance $C_2$) between the objective lens 21 and the laser reflecting mirror 31 may be determined according to the actual position of the objective lens 21 combined with data of the grating ruler and the initially known measurement value.

In the embodiment, the actual distance C between the object 1000 to be measured and the objective lens 21 may be obtained by calculation. As shown in FIGS. 3-5, in the focusing method in the embodiment, the object 1000 to be measured includes the sample (not shown in the figure, the sample may be a biological cell to be measured) and the transparent slide (not shown in the figures). The first reflected ray β passes through the transparent slide to irradiate the surface of the sample. Since the transparent slide has the upper and the lower surface, the two surfaces will respectively reflect the first reflected ray β, and then form two ray spots on the laser imaging plane 3221. However, the ray spot on the laser imaging plane 3221 of the triangular laser rangefinder 32 after reflection from the upper surface of the transparent slide is relatively weak, and calculating with the ray spot results in greater inaccuracy than calculating with the ray spot formed by the lower surface. Therefore, in order to achieve higher accuracy, the ray spot on the laser imaging surface 3221 of the triangulated laser rangefinder 32 after reflection from the lower surface of the transparent slide is used in the embodiment (in actual practice, the ray spot formed by the upper surface may also be used for calculation, where an error is within an allowable range). Thus, in the present embodiment, $C=C_1+C_2+C_3$, $C_3$ is a known thickness of the transparent slide. Finally, the actual distance C between the objective lens 21 and the object 1000 to be measured may be adjusted to be equal to the target object distance $C_0$.

As shown in FIGS. 1-4, in the embodiment, the distance conversion formula is: $A=D+C_1$; where D is a constant, and D represents the distance from the intersection of the height of the base of the triangle and the laser reflecting mirror 31 to the base of the triangle. The base of the triangle is the connection line L of the emitting point of the incident ray α and the receiving point of the second reflected ray θ and the vertex angle of the triangle is the intersection angle of the incident ray α and the extension line of the second reflected ray θ. The measurement distance A is a value directly measured by the triangular laser rangefinder 32.

In a case of determining the measurement distance A by the system for laser distance measuring, since a positional relationship between the triangular laser rangefinder 32 and the laser reflecting mirror 31 is fixed, D is also a known measurement constant, and then $C_1$ may be calculated, and when $C_3$, $C_2$, and $C_1$ are determined, the actual distance C between the objective lens 21 and the object 1000 to be measured may be directly obtained, so a position of the objective lens 21 may be adjusted upward or downward according to a deviation between the actual distance C and $C_0$ and make $C=C_0$, to achieve focusing.

As shown in FIGS. 3-5, the embodiment also provides the focusing system based on the system for laser distance measuring of the embodiment. The focusing system adopts the aforementioned focusing focusing method, which will not be repeated here. In addition to the laser reflecting mirror 31, the laser emitting part 321, the laser receiving part 322, and the calculation module 10, the focusing system also includes a focus displacement component 33, the objective lens 21, a tube lens 23, and a carrier 11 on which the object 1000 to be measured is placed. The objective lens 21 is arranged on the focus displacement component 33, and located on a side of the laser reflecting mirror 31 facing away from the object 1000 to be measured. The focus displacement component 33 may move the objective lens 21 along the axial direction of the objective lens 21 with respect to the object 1000 to be measured for auto-focusing. The tube lens 23 is arranged coaxially with the objective lens 21 and on a side of the objective lens 21 away from the laser reflection mirror 31. In order to enable the focus displacement component 33 to automatically drive the objective lens 21 to focus, the focusing system also includes a control module 8. The control module 8 is electrically connected with the laser emitting part 321 of the system for laser distance measuring, the laser receiving part 322 of the system for laser distance measuring, the focus displacement component 33, and the calculation module 10 of the system for laser distance measuring. The control module 8 is configured to obtain the target object distance $C_0$, the measurement distance A, and determine the actual distance C between the object 1000 to be measured and the objective lens 21, to control the movement of the focus displacement component 33, such that the actual distance C between the objective lens 21 and the object 1000 to be measured is equal to the target object distance $C_0$. The control module 8 controls the laser emitting part 321 and the laser receiving part 322 of the triangular laser rangefinder 32 to obtain the measurement distance A through the calculation module 10 based on the laser image and the geometrical trigonometry according to the above-mentioned method for laser distance measuring, and based on this, the actual distance C between the surface of the object 1000 to be measured and the objective lens 21 is obtained through the focusing method described above, and then the focus displacement component 33 is controlled to move such that the objective lens 21 auto-focuses.

Taking the embodiment as an illustration, the object distance between the surface of the object 1000 to be measured and the objective lens 21 is the actual distance between the objective lens 21 and the surface of the object 1000 to be measured, and the focal length (i.e., $C_0$ in the embodiment) of the objective lens 21 is a known and fixed value. Therefore, in order to obtain a clear object image, it is only necessary to adjust the object distance between the surface of the object 1000 to be measured and the objective lens 21 so that the object distance is within 1-2 times the focal length range of the objective lens 21. In the embodiment, the object distance is 1 times the focal length, that is, the actual distance C being made to be equal to the focal length. In other embodiments, the target object distance $C_0$ may also be 1-2 times the focal length of the objective lens 21.

As shown in FIGS. 3-5, in the embodiment, the laser reflecting mirror 31 includes a semi-transmissive and semi-reflective mirror, and the first reflected ray β and the return ray γ are coaxial with the axis of the objective lens 21 with respect to the normal line of the object 1000 to be measured. The laser reflecting mirror 31 is inclined at 45 degrees to a horizontal plane, the incident ray α is located in the horizontal plane, and the incident angle of the incident ray α is S (the normal line O in the figure is a line perpendicular to the laser reflecting mirror 31). The laser reflecting mirror 31 is designed at a position between the objective lens 21 and the object 1000 to be measured and directly facing the objective lens 21, while the first reflected ray β and the return ray γ are kept coaxial with the axis of the objective lens 21 with respect to the normal of the object 1000 to be measured, so as to ensure that the distance from the point of reflection of the first reflected ray β on the object 1000 to be measured along the direction of the first reflected ray β and the return ray γ with respect to the normal line of the object 1000 to be measured to the laser reflecting mirror 31, as described previously, is directly equal to the distance from the laser reflecting mirror 31 along the axis of the objective lens 21 to the lower surface of the object 1000 to be measured, i.e., to ensure that $C=C_1+C_2+C_3$. The laser reflecting mirror 31 is designed to be a semi-transmissive and semi-reflective mirror to ensure that the ray can pass through the laser reflecting mirror 31, thereby minimizing the interference and influence of the laser reflecting mirror 31 on the objective lens 21, ensuring sufficient luminous flux, and then ensuring that the objective lens 21 can observe the object 1000 to be measured. In the embodiment, the advantage of designing the laser reflecting mirror 31 here is that a synchronous focus in real time can be achieved while the objective lens 21 is being observed, greatly improving the observation efficiency.

A thickness of the laser reflecting mirror 31 is 650 nm, and a wavelength of the incident ray α is 655 nm. In addition, since the distance measuring principle of the embodiment is realized based on the triangular geometric similarity principle, the laser reflecting mirror 31 can only be placed on the side of the objective lens 21 facing the object 1000 to be measured, so as to ensure that the ray emitted by the system for laser distance measuring is not interfered by the objective lens 21. For example, if the laser reflecting mirror 31 is placed between the objective lens 21 and the tube lens 23, and faces the objective lens 21, or faces to the side of the tube lens 23 away from the objective lens 21, the ray emitted by the system for laser distance measuring may not be measured due to a refraction effect of lenses of the objective lens 21 and the tube mirror 23.

As shown in FIGS. 3-5, in order to understand a focusing process, the focusing process of the embodiment is as follows. During actual microscopic observation, various objects 1000 to be measured will be placed on the carrier 11 in sequence for observation through the objective lens 21. Since the surfaces of the various objects 1000 to be measured may be uneven, and the surface of a same object 1000 to be measured may be uneven at different positions, the actual distance C may become larger or smaller when the position of the objective lens 21 is fixed, resulting in unclear object images. Since the distance measuring for the actual distance C is performed at the same time, when the actual distance C is greater than the target object distance $C_0$, the control module 8 controls the focus displacement component 33 to drive the objective lens 21 close to the object 1000 to be measured until the actual distance C is equal to the target object distance $C_0$, and when the actual distance C is smaller than the target object distance $C_0$, the control module 8 controls the focus displacement component 33 to drive the objective lens 21 away from the object 1000 to be measured until the actual distance C is equal to the target object distance $C_0$, so that clear object images can be obtained consistently.

As shown in FIGS. 3-5, in the embodiment, the focusing system further includes a camera 24. The camera 24 is set at an end of the tube lens 23 away from the objective lens 21, and the camera 24 is configured to photograph the object 1000 to be measured through the objective lens 21 and the tube lens 23, and then realize the camera function in the meantime of real-time focusing. The camera 24 and the control module 8 are controllingly connected, and the control module 8 may brake and activate the camera 24 to photograph when a completion of focusing is confirmed, realizing automation of photographing, thus improving work efficiency, and reducing manual operation.

In addition, in order to ensure sufficient brightness of a field of view, as shown in FIGS. 3-5, the focusing system also includes a bright field light source 6. In the embodiment, the bright field light source 6 is arranged on a side of the laser reflecting mirror 31 facing the object 1000 to be measured, and the object 1000 to be measured is located between the bright field light source 6 and the laser reflecting mirror 31. The bright field light source 6 is configured to generate a bright field ray, which enables supplementary ray. Similarly, the control module 8 is controllingly connected with the bright field light source 6 to control the bright field light source 6.

In addition, as shown in FIGS. 3-5, according to the focusing method described above, in the embodiment, the object 1000 to be measured includes the sample and the transparent slide. The sample is carried on the transparent slide, and the transparent slide is placed on the upper surface of the carrier 11. At the same time, a ray-transmitting hole is opened on the carrier 11, and the first reflected ray β can pass through the ray-transmitting hole, irradiate the lower surface of the transparent slide, and be reflected by the lower surface of the transparent slide to generate the return ray γ, thereby ensuring focusing according to the focusing method described above.

The focusing system also includes a translation component 12. The translation component 12 is drivingly connected to the carrier 11, and the translation component 12 can drive the carrier 11 to move horizontally. The translation component 12 is a linear mechanism, which is not repeated herein. The control module 8 is controllingly connected to the translation component 12 to control the translation component 12 to work.

Figure 6:
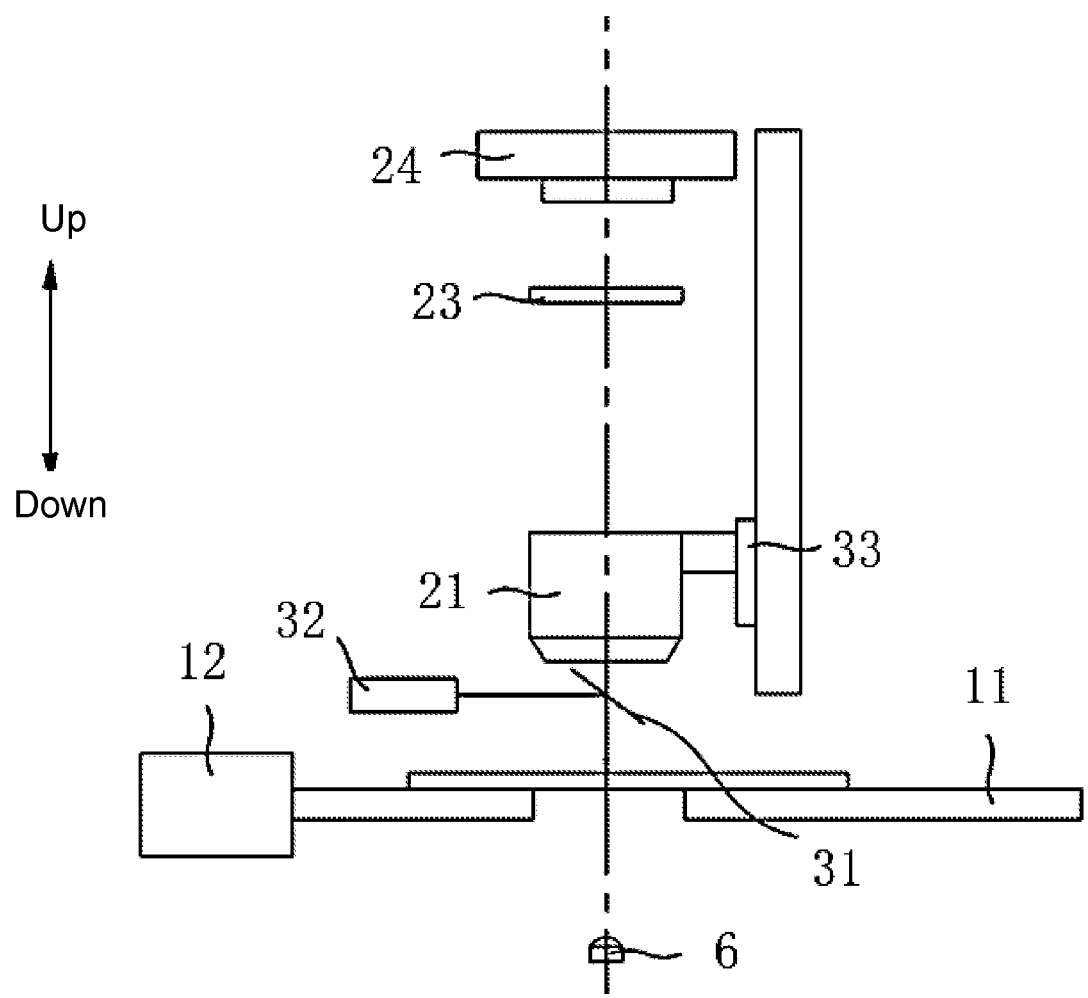
FIG. 6 is a schematic structural diagram of another focusing system according to some embodiments of the present disclosure.
Figure 7:
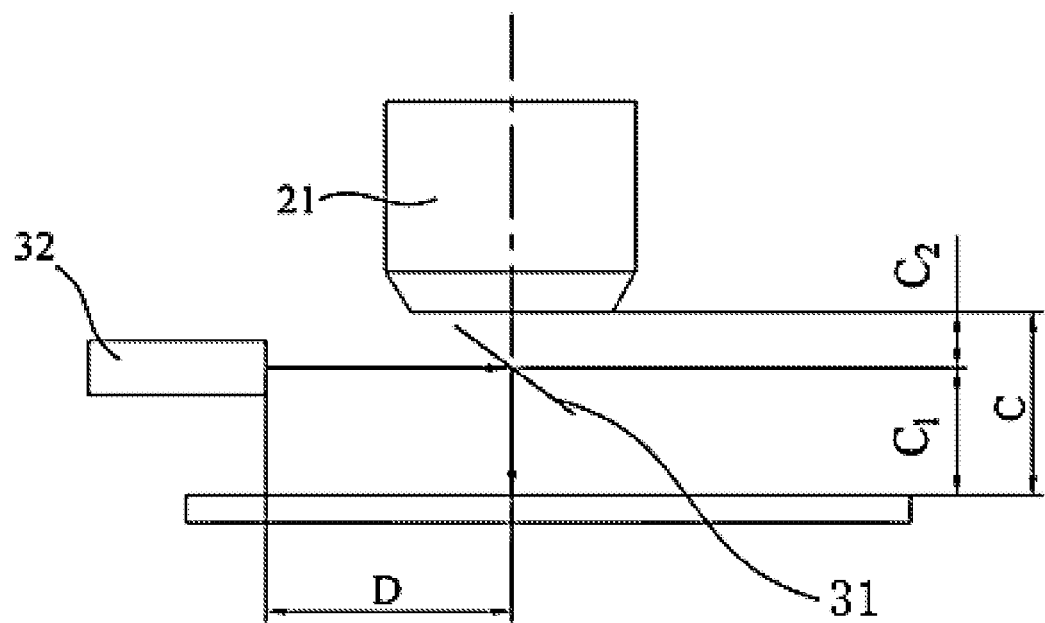
FIG. 7 is a schematic diagram of a distance relationship during auto-focusing of the focusing system in FIG. 6 according to some embodiments of the present disclosure.

As shown in FIGS. 6-7, in another embodiment based on the focusing system provided in the embodiment, the objective lens 21 may also be arranged directly above the object 1000 to be measured, and the laser reflecting mirror 31 still be arranged between the objective lens 21 and the object 1000 to be measured, and faces the objective lens 21, without modifying other structures. In this case, the first reflected ray β directly irradiates the sample surface of the object 1000 to be measured, so there is no need to consider the thickness $C_3$ of the transparent slide. Therefore, the actual distance between the object 1000 to be measured and the objective lens 21 is $C=C_1+C_2$, and the distance conversion formula is still: $A=D+C_1$. The improved embodiment may be applicable to an application scenario where the objective lens 21 is allowed to be arranged directly above the object 1000 to be measured.

Figure 8:
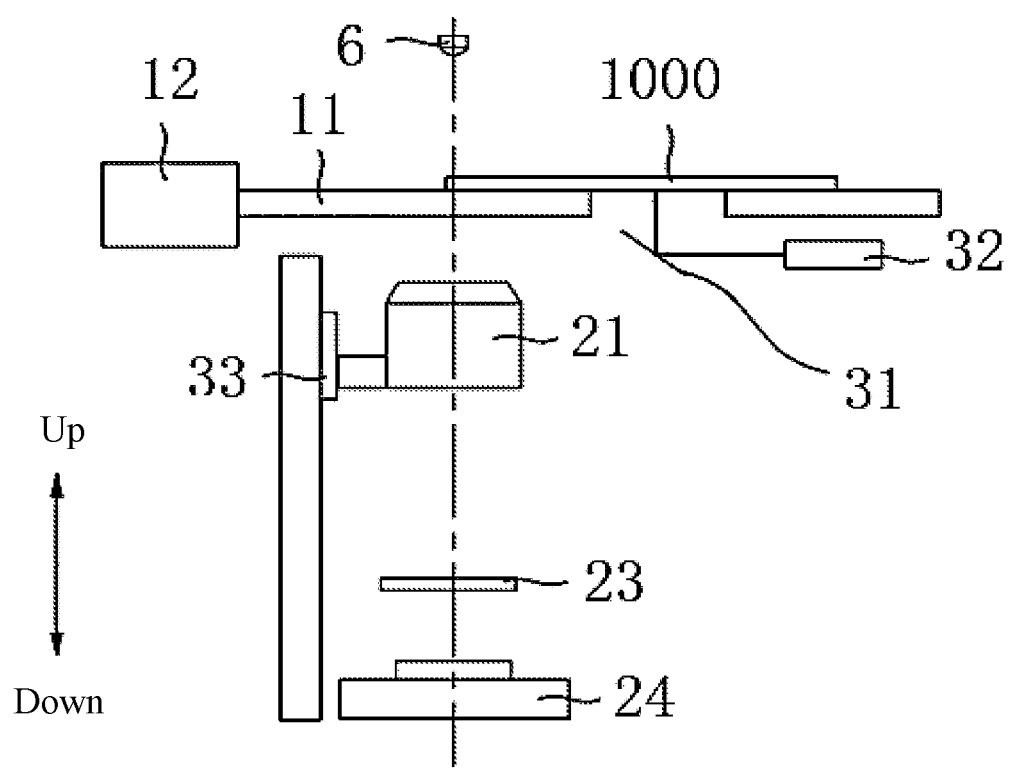
FIG. 8 is a structural schematic diagram of a focusing system according to some embodiments of the present disclosure when an object to be measured moves horizontally to a distance measuring station.

As shown in FIG. 8, in yet another embodiment based on the focusing system provided in the embodiment, the laser reflecting mirror 31 may be arranged at an avoidance position on the side of the objective lens 21 close to the object 1000 to be measured to avoid the objective lens 21. As mentioned above, the focusing system further includes the carrier 11 and the translation component 12. The object 1000 to be measured is placed on the carrier 11. The translation component 12 is drivingly connected to the carrier 11, and drive the carrier 11 to move, such that the object 1000 to be measured on the carrier 11 optionally moves to a distance measuring station or an observation station. Along the axial direction of the objective lens 21, the distance measurement station faces the laser reflecting mirror 31, the observation station faces the objective lens 21, and the distance measuring station and the observation station are located in a plane perpendicular to the axis of the objective lens.

When the object 1000 to be measured is located at the distance measuring station, the focusing system may obtain the measurement distance A according to the method for laser distance measuring described above; and when the object 1000 to be measured is located at the observation station, the focusing system may complete auto-focusing according to the method for laser distance measuring and the focusing method described above. The advantage of the design is that the laser reflecting mirror 31 may be prevented from interfering with observation through the objective lens 21, the laser reflecting mirror 31 may not need to include a semi-transmissive and semi-reflective mirror, and the thickness of the laser reflecting mirror 31 may not be restricted. However, during actual focusing, the object 1000 to be measured may only be measured at the distance measuring station to complete the measuring of the measurement distance A; then, under the drive of the translation component 12, the object 1000 to be measured is docked at the observation station before focusing can be performed. Therefore, in comparison with the embodiment in FIG. 3, the error is larger (although within the allowable range for the system), and the work efficiency is also affected, preventing simultaneous implementation of observation and focusing actions.

For this reason, in some other embodiments, it is defined that when the object 1000 to be measured is located at the observation station, the part facing the observation station is $E_1$ of the object 1000 to be measured (not shown in FIG. 8), and the part facing the distance measuring station is $E_2$ of the object 1000 to be measured (not shown in FIG. 8), and the measurement distance A measured at $E_2$ at the measurement station is directly and synchronously used to replace the measurement distance A measured at $E_1$ for auto-focusing, sparing the need to move the object 1000 to be measured to the distance measuring station for distance measuring before moving the object 1000 to be measured to the observation station for focusing. Although there is a certain error, the error is within the allowable range of the system, and distance measuring and focusing are realized simultaneously.

The focusing method of the present disclosure is proposed based on the method for laser distance measuring of the present disclosure, and the first choice is to determine the target object distance $C_0$; then, the measurement distance A is determined based on the method for laser distance measuring of the present disclosure; wherein the laser reflecting mirror is arranged between the objective lens and the object to be measured; then, the second distance $C_2$ between the objective lens and the laser reflecting mirror along the axial direction of the objective lens is obtained, and the first distance $C_1$ between the laser reflecting mirror and the object to be measured along the axial direction of the objective lens is obtained based on the measurement distance A; the actual distance C between the object to be measured and the objective lens is calculated; and finally, the actual distance C between the objective lens and the object to be measured is adjusted to be equal to the target object distance $C_0$. Based on the method for laser distance measuring of the present disclosure, the real-time calculation of the actual distance C during the focusing process is realized, which effectively assists the real-time adjusting and focusing of the objective lens, with high measuring accuracy and low time consumption. The method for laser distance measuring adopts the laser reflecting mirror to make the arrangement of triangulation-based laser distance measuring related devices more flexible, and can be applied to indirect distance measuring in a confined space.

The focusing system provided by the present disclosure has high measuring accuracy and low time consumption, and the method for laser distance measuring adopted by the focusing make the arrangement of triangulation-based laser distance measuring related devices more flexible by the laser reflecting mirror, and can be applied to indirect distance measuring in a confined space.

As shown in FIGS. 9-12, the embodiment provides a high-throughput device for auto-focusing analysis, a system for auto-focusing analysis which includes the high-throughput device for auto-focusing analysis, and a method for auto-focusing analysis based on the high-throughput device for auto-focusing analysis. The device, system, and method for auto-focusing analysis have the advantages of high automation level, high flexibility, simple and convenient operation, and high work efficiency, and can realize efficient auto-focusing analysis. In the figures, M represents a first direction, and N represents a second direction.

As shown in FIGS. 9-12, the high-throughput device for auto-focusing analysis includes a loading mechanism 1, a microscopic imaging mechanism 2, an auto-focusing analysis mechanism 3, and a light source mechanism. The loading mechanism 1 is configured to carry a sample carrier plate 100. The sample carrier plate 100 is provided with at least two carrying positions. The carrying positions are configured to carry samples (not shown in the figures). The carrying positions may be positioning accommodating grooves (not shown in the figures) configured to position and place the samples (not shown in the figures), and the sample carrier plate 100 may be placed horizontally and fixedly in the loading mechanism 1. The loading mechanism 1 is also configured to drive the sample carrier plate 100 to translate along at least one direction, such that the carrying positions on the sample carrier plate 100 are sequentially located at an observation position. The microscopic imaging mechanism 2 is configured to sequentially obtain microscopic imaging of each of the samples at the carrying positions when the sample is located at the observation position. The auto-focusing mechanism 3 is drivingly connected with the microscopic imaging mechanism 2, and configured to adjust the object distance C between an objective lens 21 of the microscopic imaging mechanism 2 and the sample at the observation position based on a triangular laser distance measuring technique before the microscopic imaging is obtained to make the object image clear. The light source mechanism is configured to provide a light source to the sample that is at the observation position. The light source mechanism includes a fluorescent component 4 and an automatic filter switching component 5. The fluorescent component 4 includes a fluorescent light source 41 and at least two filter cubes 42. The fluorescent light source 41 may provide a target fluorescence excitation ray to the sample that is at the observation position through any one of the at least two filter cubes 42 to make the sample at the observation position fluoresce. The filter automatic switching component 5 is drivingly connected with the at least two filter cubes 42, and configured to enable one of the at least two filter cubes 42 to cooperate with the fluorescent light source 41 to provide the sample that is at the observation position with the target fluorescent excitation ray.

The auto-focusing analysis mechanism 3 of the high-throughput device for auto-focusing analysis of the embodiment is drivingly connected to the microscopic imaging mechanism 2, and the auto-focusing analysis mechanism 3 may adjust the objective lens 21 of the microscopic imaging mechanism 2 and the object distance C of the sample at the observation position according to the triangulation-based laser distance measuring technique, to obtain clear object images. The device for auto-focusing analysis has high measuring accuracy and low time consumption and can provide a light source for the sample at the observation position through the light source mechanism to assist sample analysis. The filter automatic switching component 5 is drivingly connected to the at least two filter cubes 42 to make one filter cube 42 of the at least two filter cubes 42 to cooperate with the fluorescent light source 41 to provide the sample that is at the observation position with the target fluorescent excitation ray. Then the sample with fluorescent substances is excited to fluoresce, allowing flexible fluorescence microscopic analysis. Its advantage of this design is that it can realize auto-focusing analysis, keep the object image clear at all times, achieve convenient operation and high work efficiency, and realize the automation of filter switching. In this way, the filter cubes 42 can be adjusted automatically according to the demand of the sample to provide the required target fluorescence excitation light, with high flexibility and easy operation.

Figure 9:
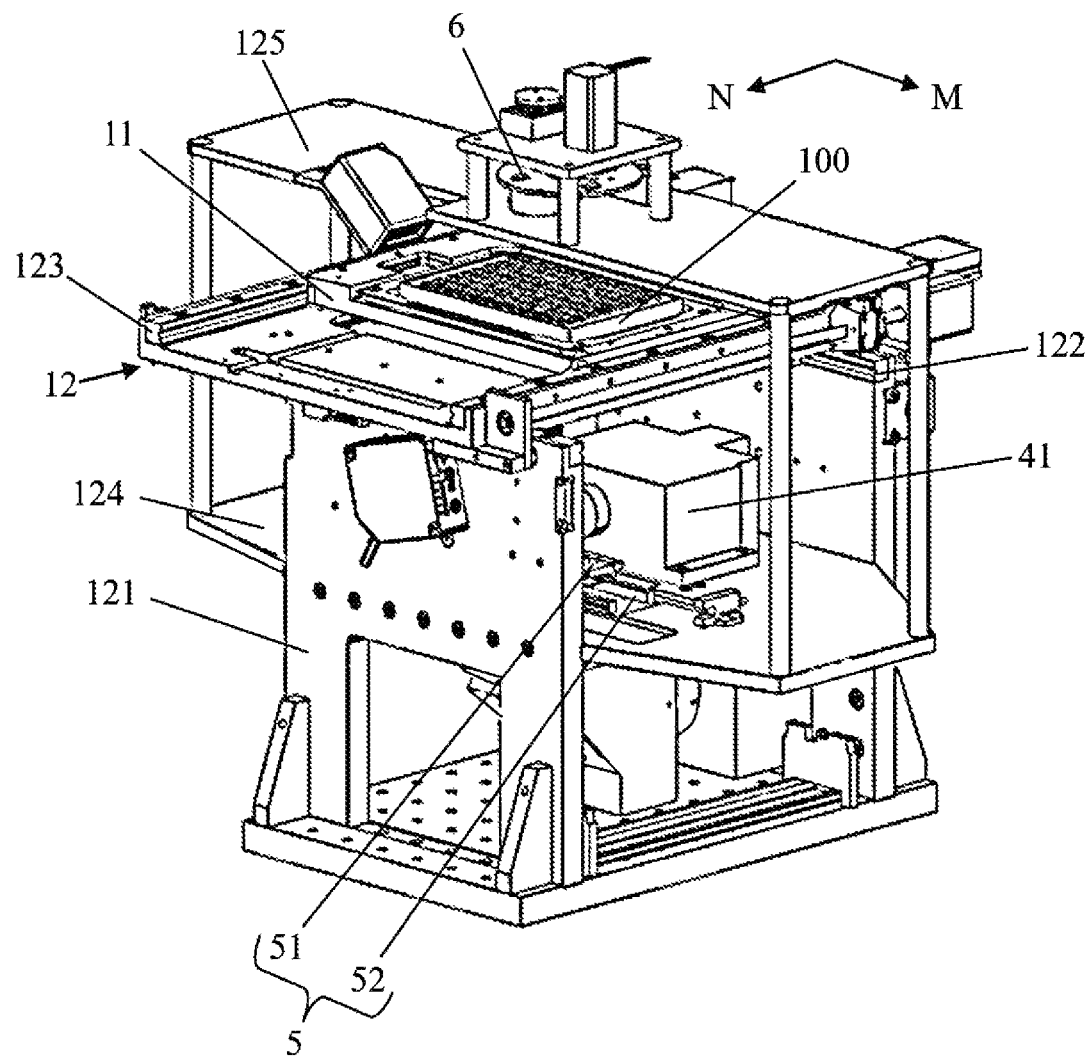
FIG. 9 is a three-dimensional schematic diagram of a high-throughput device for auto-focusing analysis according to some embodiments of the present disclosure.
Figure 10:
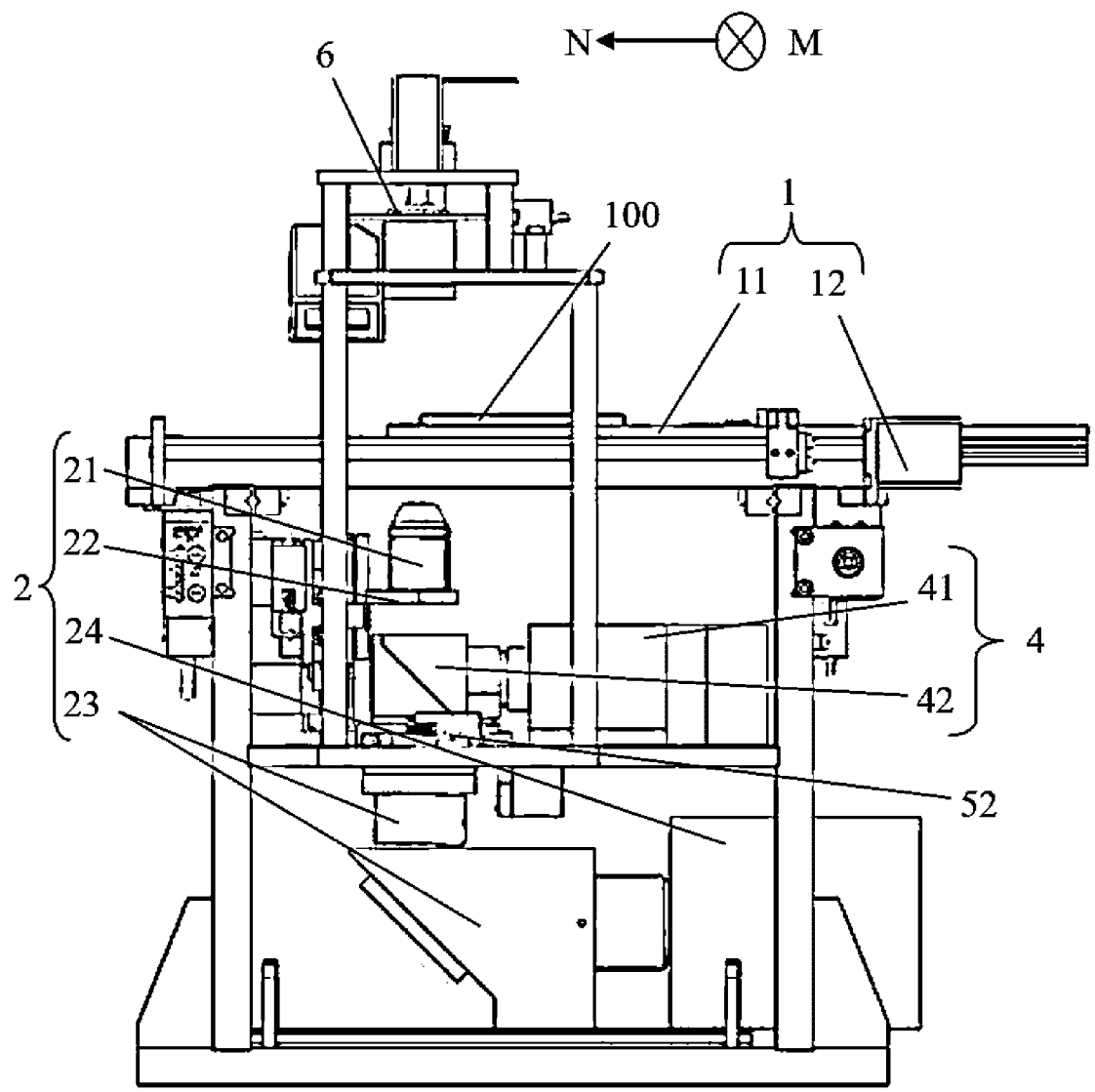
FIG. 10 is a schematic image of a side view of a high-throughput device for auto-focusing analysis according to some embodiments of the present disclosure.
Figure 11:
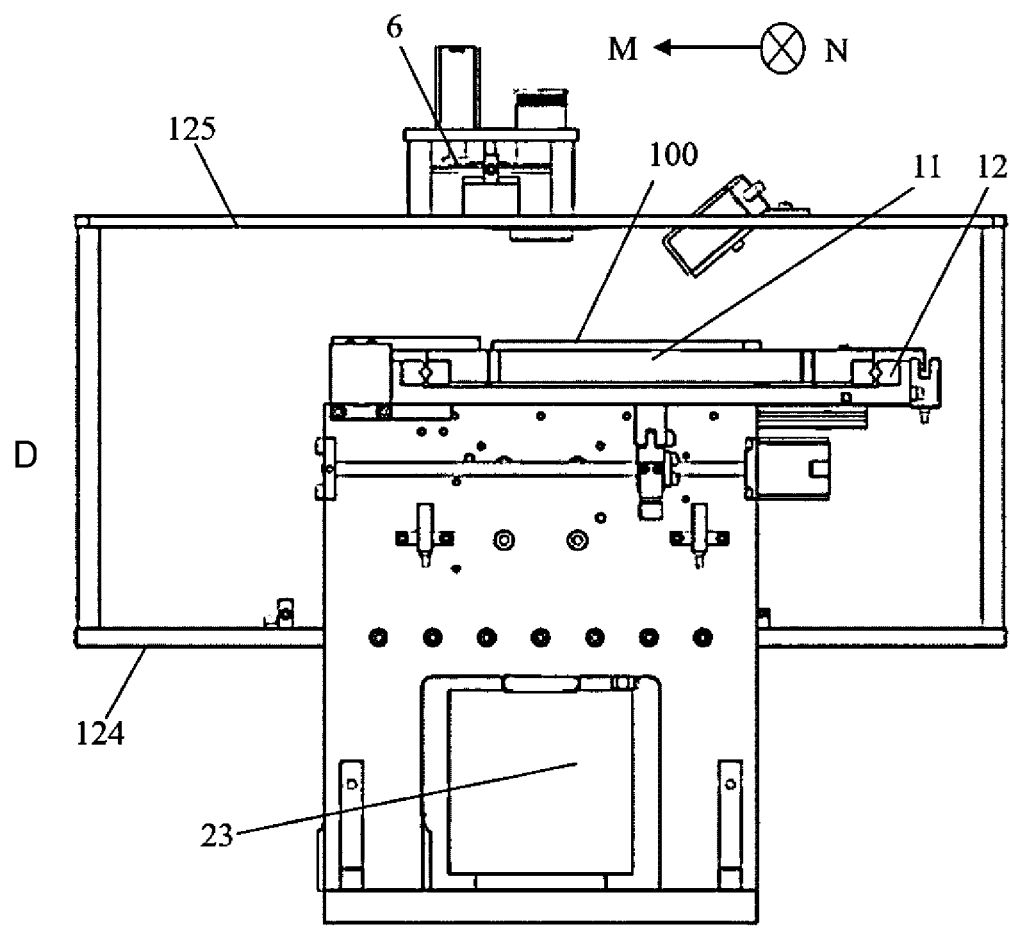
FIG. 11 is a schematic image of a side view of another high-throughput device for auto-focusing analysis according to some embodiments of the present disclosure.

Since a large count of samples need to be analyzed in actual analysis, in order to improve work efficiency, the level of automation is improved. As shown in FIGS. 9-11, in the embodiment, the loading mechanism 1 includes the carrier 11 and the translation component 12. The carrier 11 is configured to carry the sample carrier plate 100, and the sample carrier plate 100 is provided with a plurality of carrying positions, such that a plurality of samples may be placed on the carrier 11. The translation component 12 is configured to carry the carrier 11, and automatically translate the carrier 11, such that any one of the plurality of samples may be selected and transported to the observation position. Therefore, the plurality of samples can be transported to the observation position through the translation component 12 respectively, to assist in the microscopic analysis of the plurality of samples, sparing the need of manual adjustment and greatly improving work efficiency.

As shown in FIGS. 9-12, in the embodiment, the translation component 12 includes a frame 121, a first displacement driving part 122, and a second displacement driving part 123. The first displacement driving part 122 is arranged on the frame 121 and the second displacement driving part 123 is arranged at an output end of the first displacement driving part 122. The first displacement driving part 122 is configured to drive the second displacement driving part 123 to move horizontally along the first direction. The carrier 11 is fixed at an output end of the second displacement driving part 123, and the second displacement driving part 123 is configured to drive the carrier 11 to move horizontally along the second direction. The first direction is perpendicular to the second direction. In the figure, M represents the first direction, and N represents the second direction. In the embodiment, the frame 121 includes a top plate 1211 and pillars (not shown in the figures) fixed on both sides of the top plate 1211. The middle part of the top plate 1211 is hollowed out to avoid affecting microscopic analysis. The first displacement driving part 122 includes a ball screw nut drive mechanism (not shown in the figures) and a first horizontal bottom plate (not shown in the figures). The first horizontal bottom plate is arranged in connection with the top flat plate 1211 through a slide slider guide component (not shown in the figures) and the top flat plate 1211, and the first horizontal bottom plate may slide reciprocally in the first direction. The ball screw nut drive mechanism is arranged on the top flat plate 1211 and is drivingly connected to the first horizontal bottom plate to drive the first horizontal bottom plate to slide reciprocally in the first direction. Similarly, the second displacement driving part 123 includes a second horizontal bottom plate (not shown in the figures), and another corresponding ball screw nut drive mechanism. The second horizontal bottom plate is arranged on the first horizontal bottom plate through another slide slider guide component, and the corresponding ball screw nut drive mechanism is configured to drive the second horizontal bottom plate to reciprocate along the second direction. The ball screw nut drive mechanism has high working precision and can realize precise control of displacement, thereby ensuring that the sample can accurately dock at the observation position. Displacement strokes of the second displacement driving part 123 and the first displacement driving part 122 are respectively detected by the grating ruler, so as to achieve accurate detection and control of displacement.

As shown in FIGS. 9-11, in order to realize the automatic switching of the filter cubes 42, the filter automatic switching component 5 includes a filter carrier plate 51 and a carrier plate displacement component 52. The filter carrier plate 51 is provided with at least two filter cube fixing positions, and each of the at least two filter cubes 42 is fixed at one of the at least two filter cube fixing positions. The filter carrier plate 51 is arranged at an output end of the carrier plate displacement component 52, and the carrier plate displacement component 52 is configured to drive the filter carrier plate 51 to move, such that one filter cube 42 of the at least two filter cubes 42 moves to the docking position and cooperate with the fluorescence light source 41 to provide the target fluorescence excitation light to the sample at the observation position. As shown in FIGS. 9-11, a middle carrier plate 124 is fixedly arranged in a middle between the two pillars of the frame 121, the carrier plate displacement component 52 is fixed on the middle carrier plate 124, and the filter carrier plate 51 is connected to the middle carrier plate 124 through a slide slider. The carrier plate displacement component 52 includes a carrier plate displacement servo motor (not shown in the figures), and the carrier plate displacement servo motor is drivingly connected to an output end of the carrier plate displacement to drive the filter plate 51 to move, realizing automatic switching of the filter cubes 42. The filter carrier plate 51 may be provided with four filter cube fixing positions, and each of the four filter cube fixing positions may accommodate a filter cube 42. The four filter cubes 42 may respectively provide a green ray, a blue ray, a purple ray, and a red ray, thereby satisfying requirements of different fluorescent uses and greatly improving the versatility, with a simple structure and low cost. The structure of the filter cubes 42 is a related technology, which is not repeated herein.

As shown in FIGS. 9-11, in the embodiment, the light source mechanism also includes a bright field light source 6 in addition to the fluorescent light source 41. The bright field light source 6 is arranged above the loading mechanism 1, and configured to provide the bright field ray to the sample at the observation position. In the embodiment, the microscopic imaging mechanism 2, the auto-focusing mechanism 3, the fluorescent component 4, and the filter automatic switching component 5 are all located below the loading mechanism 1, and a ray-transmitting observation hole is pierced on the carrying positions of the carrier 11. The microscopic imaging mechanism 2 may microscopically observe the sample at the observation position through the ray-transmitting observation hole. As shown in FIGS. 9-12, a bright field light source carrier plate 125 is suspended above the loading mechanism 1 at intervals, and the four corners of the bright field light source carrier 125 are respectively connected to the middle carrier plate 124 through connecting columns, thereby ensuring that the bright field light source carrier plate 125 is suspended in the air, and the bright field light source carrier plate 125 and the middle carrier plate 124 form a storage and avoidance space, allowing the loading mechanism 1 to move freely in the storage and avoidance space to realize switching of the samples. The entire high-throughput device for auto-focusing analysis is compact and well-designed. In addition, the second horizontal bottom plate of the second displacement driving part 123 and the first horizontal bottom plate of the first displacement driving part 122 are hollowed out, such that the microscopic imaging mechanism 2 may pass through the ray-transmitting observation hole opened on the carrier 11 that is docked at the observation position for microscopical observervation of the corresponding sample.

Figure 12:
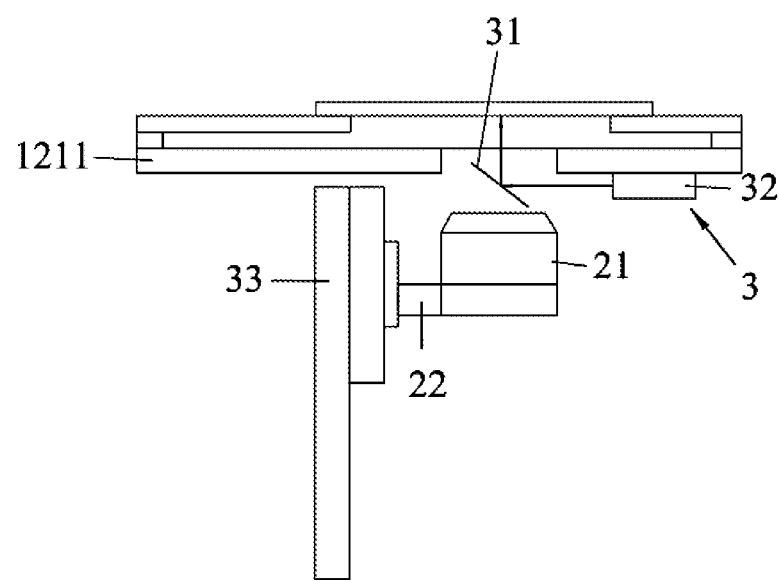
FIG. 12 is a schematic diagram of measuring a distance of a sample by an auto-focusing mechanism of a high-throughput device for auto-focusing analysis according to some embodiments of the present disclosure.

Since fluorescence microscopic analysis requires high focusing accuracy and compressed focusing time to improve efficiency in high-volume sample analysis, methods for laser distance measuring with low accuracy are not applicable to actual focusing tasks. As shown in FIGS. 1, 2, and 12, in the embodiment, the auto-focusing mechanism 3 adopts the principle of triangulation-based laser distance measuring to realize auxiliary distance measuring and focusing. The auto-focusing mechanism 3 includes the laser reflecting mirror 31, the triangular laser rangefinder 32, the focus displacement component 33, and the control module. The laser reflecting mirror 31 is fixedly arranged between the objective lens 21 and the sample at the observation position. The laser reflecting mirror 31 is fixed on a lower surface of the top plate 1211 by a fixed bracket (not shown in the figures), and the triangular laser rangefinder 32 is also fixed on the lower surface of the top plate 1211. Positions of both the laser reflector 31 and the triangular laser rangefinder 32 remain unchanged. The triangular laser rangefinder 32 is configured to emit a laser ray to the laser reflecting mirror 31 for detection and calculation of the measurement distance A. In the embodiment, the triangular laser rangefinder 32 is configured to emit the incident ray $\alpha$ having the incident angle $\delta$ and the wavelength 655 nm to the reflective surface of the laser reflecting mirror 31. The incident ray $\alpha$ is reflected to generate the first reflected ray $\beta$, and the first reflected ray $\beta$ irradiates the surface of the sample to generate the return ray $\gamma$. The return ray $\gamma$ is reflected by the reflective surface of the laser reflecting mirror 31 to generate the second reflected ray $\theta$. The triangular laser rangefinder 32 is also configured to receive the second reflected ray $\theta$, generate the laser image, and determine the measurement distance A based on the laser image and the geometrical trigonometry. Then the first distance $C_1$ between the sample and the laser reflecting mirror 31 along the axial direction of the objective lens 21 is obtained based on the measurement distance A and the distance conversion formula.

The height of the base of the triangle is equal to the measurement distance A. The base of the triangle is the connection line L of the emitting point of the incident ray $\alpha$ and the receiving point of the second reflected ray $\theta$ and the vertex angle of the triangle i the intersection angle of the incident ray α and the extension line of the second reflected ray θ as the vertex angle.

As shown in FIGS. 1, 2, and 12, in the embodiment, the first reflected ray β and the return ray γ are coaxial with the axis of the objective lens 21 with respect to the normal line of the sample, that is, the laser reflecting mirror 31 is between the objective lens 21 and the observation position and directly faces the objective lens 21. In order to minimize the influence on observation through the objective lens 21, the laser reflecting mirror 31 includes a semi-transmissive and semi-reflective mirror, and a thickness of the laser reflecting mirror is 650 nm. In addition, the laser reflection mirror 31 is inclined at 45 degrees to the horizontal plane, and the incident ray α is located in the horizontal plane to emit the incident ray α to the laser reflection mirror 31. The second distance $C_2$ between the objective lens 21 along the axial direction of the objective lens 21 and the laser reflecting mirror 31 is known (when the objective lens 21 is at a known position, the second distance $C_2$ is a known constant. In some other embodiments, a position measuring device is also included to measure the second distance $C_2$). $C_2$ is used to calculate the object distance C (a method and a formula for calculating the object distance C will be described in detail below). On the basis of completing the measuring of the object distance C, the objective lens 21 may be driven to move. As shown in FIGS. 1, 2, and 12, the auto-focusing mechanism 3 also includes the focus displacement component 33. The objective lens 21 is arranged at an output end of the focus displacement component 33, and the focus displacement component 33 is configured to adjust the object distance C between the sample at the observation position and the objective lens 21 along the axial direction of the objective lens 21, such that the object distance C is equal to the target object distance $C_0$. The control module is electrically connected to the triangular laser rangefinder 32 and the focus displacement component 33, and configured to obtain the target object distance $C_0$, the first distance $C_1$, and the second distance $C_2$, and determine the object distance C between the sample and the objective lens 21, to control a movement of the focus displacement component 33, such that the object distance C is equal to the target object distance $C_0$, thereby realizing automatic measuring of the object distance C and auto-focusing. In some embodiments, for samples at different carrying positions, the above-mentioned method may be used to determine the object distance C between the sample and the objective lens 21 and control the movement of the focus displacement component 33 such that the object distance C is equal to the target object distance $C_0$. In some other embodiments, in order to reduce an amount of calculation, a reference carrying position may be determined first, and a corresponding measurement distance (denoted as $A_{ref}$) may be obtained by measurement, and the object distance C between the sample at the reference carrying position and the objective lens 21 may be determined and the focus displacement component 33 may be controlled to move to make the object distance C equal to the target object distance $C_0$. Subsequently, when the sample at a remaining carrying position is focused, it is only necessary to measure a measurement distance (denoted as $A_1$), and a difference obtained by subtracting $A_{ref}$ from $A_1$ is a variation of the object distance. If the difference is greater than zero, the control module controls the focus displacement component 33 to drive the objective lens 21 to move close to the sample with a corresponding amount of variation of the object distance to achieve focusing. When the difference is less than zero, the control module controls the focus displacement component 33 to drive the objective lens 21 to move away from the sample with a corresponding amount of variation of the object distance to achieve focusing.

As shown in FIGS. 1, 2, and 12, regarding a specific principle for calculating the measurement distance A, the triangular laser rangefinder 32 includes the laser emitting part 321 and the laser receiving part 322. An emitting point of the laser emitting part 321, a receiving point of the laser receiving part 322, and a mirror-symmetric imaging point of the sample in the laser reflecting mirror 31 are connected to form a triangle. A distance between the emitting point of the laser emitting part 321 and the receiving point of the laser receiving part 322 is B, and B is a known constant. An included angle between the incident ray α and the connection line L of the emitting point of the laser transmitting part 321 and the receiving point of the laser receiving part 322 is ε and ε is a known constant. The included angle between the connecting line L and the second reflected ray θ is ζ.

As shown in FIGS. 1, 2, and 12, in the embodiment, the laser receiving part 322 includes the laser imaging plane 3221. The receiving lens 3222 is configured to receive the second reflected ray θ and project the second reflected ray θ on the laser imaging plane 3221. The laser imaging plane 3221 is parallel to the connecting line L. According to a triangle similarity principle, it is known that ζ is equal to the included angle formed by the projection of the second reflected ray θ on the laser imaging plane 3221, so the calculation formula for ζ is: $\zeta = \arcsin(X/(X^2+Y^2)^{1/2})$;

where X represents the distance between the receiving point and the laser imaging plane 3221; and Y represents the distance between the vertical line passing through the receiving point and perpendicular to the laser imaging plane 3221 and the laser image generated by the second reflected ray θ on the laser imaging plane 3221.

Since the included angle ε between the incident ray α and the connection line L of the emitting point of the laser transmitting part 321 and the receiving point of the laser receiving part 322 is a known fixed constant, B is also a constant, and ζ is calculated, the measurement distance A may be determined according to an angle-side relationship of a geometric triangle (two angles and one side are known).

When the triangle is an isosceles triangle, the base of the triangle is the connection line L of the emitting point of the incident ray α and the receiving point of the second reflected ray θ, and the vertex angle of the triangle is the intersection angle of the incident ray α and the extension line of the second reflected ray θ, the formula for calculating measurement distance A is: $A = B/2 * X/Y$;

In addition, according to the geometrical trigonometry, as mentioned above, when the included angle between the second reflected ray θ and the laser imaging plane 3221 is known to be ζ, the included angle between the connection line L of the emitting point of the incident ray α and the receiving point of the second reflected ray θ and the incident ray α is known to be F, and length of the connection line L of the emitting point of the laser emitting part 321 and the receiving point of the laser receiving part 322 is known to be B, that is, when two angles and one side are known, the measurement distance A may also be determined according to the geometrical trigonometry, and may not necessarily need to be calculated using the formula $A = B/2 * X/Y$ in the embodiment. Since the calculation process is a conventional calculation, it is not repeated herein. So far, the measurement distance A has been determined.

The sample carrier plate 100 of the present disclosure may include a transparent slide. The transparent slide includes an upper surface and a lower surface, and the sample to be measured is placed on the upper surface of the transparent slide. The triangular laser rangefinder 32 may obtain the measurement distance $A_u$ corresponding to the upper surface and the measurement distance $A_l$ corresponding to the lower surface. $A_u$ or $A_l$ may be used as the measurement distance A described above. With reference to FIGS. 1, 2, and 12, it is known that the distance conversion formula is: $A=D+C_1$; where D represents a distance from an intersection of the height of the base of the triangle and the laser reflecting mirror 31 to the base of the triangle, where the base of the triangle is the connection line L of the emitting point of the incident ray α and the receiving point of the second reflected ray θ and the vertex angle of the triangle is the intersection angle of the incident ray α and the extension line of the second reflected ray θ, and D is a known constant.

Therefore, on a premise that A is determined and D is known, $C_1$ may be calculated.

As shown in FIGS. 1, 2, 4, and 12, in the embodiment, the measurement distance $A_l$ corresponding to the lower surface of the transparent slide is used as the measurement distance A mentioned above. In order to focus more accurately, a thickness $C_3$ of the transparent slide is used to correct the object distance (in other embodiments, the object distance may not be corrected using the thickness $C_3$ of the transparent slide). Therefore, in the embodiment, the object distance is $C=C_1+C_2+C_3$; wherein, $C_3$ is a known thickness of the transparent slide, and the second distance $C_2$ is also known (when the objective lens 21 is at a known position, and in some other embodiments, the second distance $C_2$ may be measured, for example, using a grating ruler to calibrate an initial distance between the objective lens 21 and the laser reflecting mirror 31, and then determining the second object distance $C_2$ in real time based on the movement of the objective lens 21 as measured by the grating ruler), so the object distance C may be determined.

When $C_3$ is unknown, since the laser reflecting mirror 31 does not change the geometrical trigonometry of the triangular laser rangefinder 32, $C_3$ may still be measured and calculated by the triangular laser rangefinder 32, which is not repeated herein.

In other embodiments, the measurement distance $A_u$ corresponding to the upper surface of the transparent slide is used as the measurement distance A mentioned above. As shown in FIG. 7, the thickness of the transparent slide may not be considered, so the object distance is $C=C_1+C_2$.

Eventually, the object distance C may be calculated with the aid of the geometrical trigonometry.

In summary, when positions of the objective lens 21, the laser reflecting mirror 31, the laser emitting part 321 and the laser receiving part 322, and the thickness $C_3$ of the transparent slide are fixed, a variation of the object distance C is a difference between $C_1$ and $C_2$. Therefore, by obtaining C1, $C_2$, and $C_3$, an amount of variation of the object distance C may be determined conveniently to assist in adjusting the object distance C for focusing. The advantage of this design is that, by adding the laser reflecting mirror 31 in the embodiment, the incident ray α is reflected by the laser reflecting mirror 31 to irradiate the surface of the sample, and the return ray γ is reflected by the laser reflecting mirror 31 and captured by the laser receiving part 322, realizing the bending of the laser ray path, such that the position arrangement of the laser emitting part 321 and the laser receiving part 322 is more flexible. According to the principle of mirror imaging, although the laser reflecting mirror 31 bends the laser ray path, it does not affect the measuring of the measurement distance, and the distance may still be measured according to the geometrical trigonometry. The design has high measuring accuracy, reaching a micron level, and low time consumption, and can be be applied to distance measuring in confined space. This design has a promising for a wide range of applications, which in turn facilitates the application of high-accuracy auto-focusing in fluorescence microscopic analysis of high-volume samples.

For a structure of the focus displacement component 33, as shown in FIGS. 9-12, the focus displacement component 33 includes a focus motor, a vertical slide slider, a slide slider support plate, and an adapter plate (none of which are shown in the figures). The slide slider support plate is vertical fixed on the middle carrying plate 124. The adapter plate is slidably connected to the slide slider support plate through the vertical slide slider, such that the adapter plate may move in a vertical direction. The focus motor is fixed on the slide slider support plate, and an output end of the focus motor is connected to the adapter plate, and the objective lens 21 is arranged on the adapter plate, such that the adapter plate is driven by the focus motor to drive the objective lens 21 to perform focusing linear movement in the vertical direction. In other embodiments, the focus displacement component 33 may also include other linear displacement devices.

In addition, in order to accurately determine a movement distance of the focusing linear movement to determine that second distance $C_2$, in the embodiment, a self-position measuring device includes a focusing moving grating ruler (not shown in the figures). The focusing moving grating ruler is a grating ruler, so that the vertical displacement of the objective lens 21 may be calculated. On the basis of setting initial values of the objective lens 21 and the laser reflecting mirror 31, the second distance $C_2$ may be determined based on a displacement difference of the objective lens 21 compared with the initial position of the objective lens 21 with the initially set value, which is not repeated herein.

Since objective lenses 21 of different magnifications are used in actual analysis, manual replacement is difficult, inconvenient, and inefficient. As shown in FIG. 10, in the embodiment, a count of the objective lenses 21 is at least two. There are three objective lenses 21, which are respectively four-fold, ten-fold and twenty-fold objective lenses. In addition to the objective lens 21, the microscopic imaging mechanism 2 also includes an objective lens switching component 22, a tube lens 23, and a camera 24. The at least two objective lenses 21 are fixed to an output end of the objective lens switching component 22, and the objective lens switching component 22 is configured to optionally drive one objective lens 21 of the at least two objective lenses 21 to face the sample at the observation position. The tube lens 23 is arranged coaxially with the objective lens 21 and on a side of the objective lens 21 away from the sample at the observation position. The camera 24 is arranged on a side of the tube lens 23 away from the objective lens 21, and configured to obtain microscopic imaging. The microscopic imaging mechanism 2 realizes electric adjustment and switching of the objective lens 21 through the objective lens switching component 22, which is convenient and simple to operate and saves time and effort. The objective lens switching component 22 is fixedly connected on an output end of the focus displacement component 33. The objective lens switching component 22 includes an objective lens switching motor, a connection bottom plate, an objective lens carrier plate, an objective lens switching slide slider (none of which are shown in the figures). The output end of the focus displacement component 33 is connected to the connection bottom plate through the objective lens switching slide slider. The objective lens switching motor is fixed on the connection bottom plate and an output end of the objective lens switching motor is connected to the objective lens carrier plate. The objective lens carrier plate is provided with three objective lens fixing holes (not shown in the figures), and the three objective lenses 21 are respectively fixedly installed on the three objective lens fixing holes. Driven by the objective lens switching motor, the objective lens carrier plate moves horizontally to realize switching of different objective lenses 21.

The objective lens switching component 22 also includes an objective lens switching grating ruler. The objective lens switching grating ruler is a grating rule in a related art, and may be configured to accurately measure and monitor a moving distance and an actual position of the objective lens carrier plate, which is not repeated herein.

In analysis of high-volume samples, a specific microscopic analysis execution strategy is generally developed to collectively process a batch of samples of a same type. When various types of samples need to be analyzed using different microscopic analysis execution strategies, it is necessary to adjust relevant settings or parameters of the objective lens 21, the object-carrying mechanism 1, the microscopic imaging mechanism 2, the auto-focusing mechanism 3, and the filter automatic switching component 5 step by step, which is cumbersome and inconvenient.

Therefore, in order to address this problem, in the present disclosure, the loading mechanism of the high-throughput device for auto-focusing analysis makes the carrying positions on the sample carrier plate sequentially located at the observation position, and the auto-focusing analysis mechanism is drivingly connected to the microscopic imaging mechanism. The auto-focusing analysis mechanism can detect and adjust the object distance between the objective lens of the microscopic imaging mechanism and the sample at the observation position to ensure that the object image is clear. In addition, the sample at the observation position can be provided with the light source through the light source mechanism to assist analysis of at least two samples. In this way, auto-focusing analysis is realized and the object image can be constantly kept clear, with the advantages of convenient operation and high work efficiency.

Figure 13:
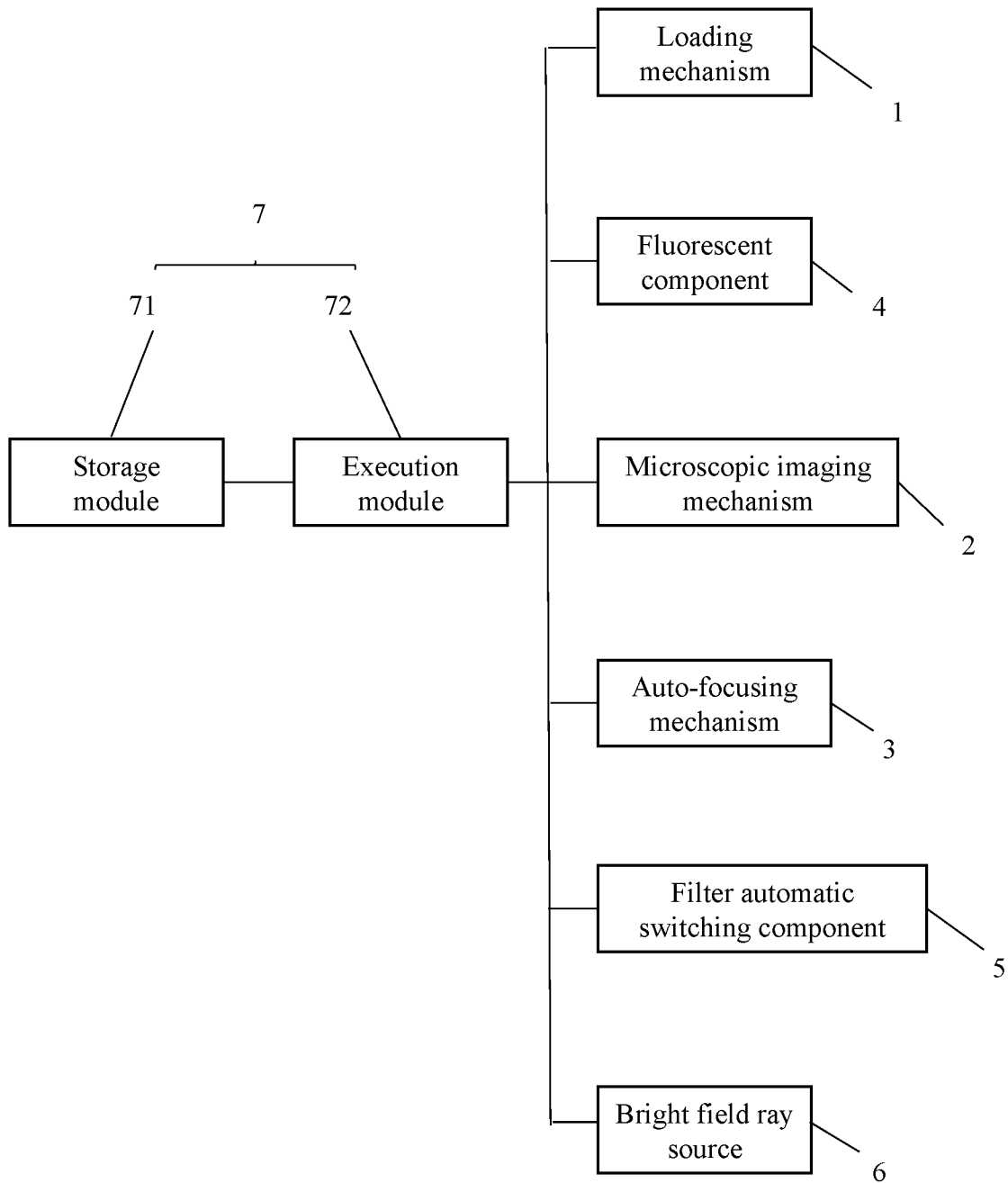
FIG. 13 is a schematic diagram of a circuit relationship between a master control mechanism and other mechanisms according to some embodiments of the present disclosure.

As shown in FIG. 13, the embodiment also provides a system for auto-focusing analysis which includes the high-throughput device for auto-focus analysis of the embodiment. The system for auto-focusing analysis also includes a master control mechanism 7. The master control mechanism 7 mainly includes a storage module 71 and an execution module 72. The master control mechanism 7 is electrically connected to the loading mechanism 1, the microscopic imaging mechanism 2, the auto-focusing mechanism 3, the fluorescent component 4, the filter automatic switching component 5, and the bright field light source 6. The storage module 71 is configured to store microscopic analysis execution strategies. The execution module 72 is configured to control the translation component 12 according to the microscopic analysis execution strategies, such that the samples at a plurality of carrying positions are sequentially transported to the observation positions in a preset order; control the filter automatic switching component 5, such that one filter cube 42 of at least two filter cubes 42 cooperates with the fluorescence light source 41 to provide the sample that is at the observation position with the target fluorescence excitation ray; control the objective lens switching component 22 to move, such that one objective lens 21 of the plurality of the objective lenses 21 faces the observation position when the objective lenses 21 of different magnifications are used; and control the auto-focusing mechanism 3 to adjust the object distance C to the target object distance $C_O$, such that the microscopic imaging mechanism 2 obtains the microscopic imaging.

The storage module 71 of the master control mechanism 7 is configured to store microscopic analysis execution strategies, a staff may, through the execution module 72, call various microscopic analysis execution strategies stored in the storage module 71, and according to the microscopic analysis execution strategies, execute rapidly and automatically adjust the relevant settings or parameters of the objective lens 21, the loading mechanism 1, the microscopic imaging mechanism 2, the auto-focusing mechanism 3, and the filter automatic switching component 5. There may be one, two, or a plurality of microscopic analysis execution strategies, and the staff may selectively call and use one of the microscopic analysis execution strategies through the execution module 72 to achieve rapid adjustment, sparing the need for the staff to repeatedly conduct control settings step by step, thereby greatly improving the work efficiency of the high-throughput device for auto-focusing. Through the master control mechanism 7, efficient and flexible cooperative control of a plurality of mechanisms and components of the high-throughput device for auto-focusing analysis is realized, and the high-throughput device can have wide application prospects.

In addition to executing the microscopic analysis execution strategies stored in the storage module 71, the execution module 72 may also withdraw from the microscopic analysis execution strategies, such that the staff may electrically control working states of a plurality of mechanisms independently, which is not repeated herein.

Based on the device for auto-focusing analysis of the embodiment, the method for high-throughput auto-focusing analysis of the embodiment includes the following steps:

determining a carrying position to be analyzed on the loading mechanism 1, and transporting the sample carried on the carrying position to be analyzed to the observation position; providing the sample that is at the observation position with the light source through the light source mechanism; adjusting the object distance C between the objective lens 21 and the sample at the observation position based on the triangular laser distance measuring technique through the auto-focusing mechanism 3 to make the object image clear; and obtaining a microscopic imaging of the sample that is at the observation position through the microscopic imaging mechanism.

When the object distance C between the objective lens 21 and the sample at the observation position is adjusted based on the triangular laser distance measuring technique, according to the method for auto-focusing analysis of the embodiment, the incident ray α is transmitted to the laser reflecting mirror 31 through the triangular laser rangefinder 32, and the incident ray α irradiates the sample at the observation position after being reflected by the laser reflecting mirror 31, and the measurement distance A is determined. The calculation process is as described above, which is not repeated herein. According to the triangulation-based laser distance measuring, the object distance C is finally determined, with high measuring accuracy and low time consumption.

As mentioned above, the light source provided by the light source mechanism is the fluorescent light source 41, and providing the light source to the sample at the observation position through the light source mechanism includes the following steps:
- determining a filter cube 42 from the at least two filter cubes 42, wherein the fluorescent light source 41 provides the sample that is at the observation position with the target fluorescence excitation ray after being filtered by the filter cube 42 for fluorescence analysis.

In addition, since the fluorescent ray emitted by the fluorescent light source 41 may interfere (fluorescent rays with different wavelengths may cause varying degrees of interference) with the laser ray emitted by the triangular laser rangefinder 32, and features (different materials, thicknesses, etc., of lenses of the filter cube 42) may also affect the determination of the measurement distance A.

When the first distance $C_1$ is obtained, a deviation of the object distance C is corrected based on the filter cube 42 and/or the target fluorescence excitation ray. The correction technique includes obtaining the measurement distance A measured in both cases by turning the fluorescent light source 41 on and off for several trials, and obtaining a deviation value by comparison to correct the deviation of the object distance C. The trial steps will not be repeated herein.

What is claimed is:

1. A focusing method, comprising:
   determining a target object distance C0;
   determining a measurement distance A, wherein a laser reflecting mirror is arranged between an objective lens and the object to be measured, and the measurement distance A is determined based on a method for laser distance measuring;
   obtaining a second distance C2 between the objective lens and the laser reflecting mirror along an axial direction of the objective lens;
   obtaining, based on the measurement distance A and a distance conversion formula, a first distance C1 between the laser reflecting mirror and the object to be measured along the axial direction of the objective lens;
   determining an actual distance C between the object to be measured and the objective lens based on the first distance C1 and the second distance C2; and
   adjusting the actual distance C between the objective lens and the object to be measured to be equal to the target object distance C0, wherein the method for laser distance measuring, comprising:
   emitting an incident ray α having an incident angle δ to a reflective surface of a laser reflecting mirror, a first reflected ray β being generated by the laser reflecting mirror reflecting the incident ray α, and the first reflected ray β irradiating an object to be measured;
   capturing a second reflected ray θ and generating a laser image on a laser imaging plane, the second reflected ray θ being generated by the reflective surface of the laser reflecting mirror reflecting a return ray γ generated after the first reflected ray β irradiates a surface of the object to be measured; and
   determining, based on the laser image, a measurement distance A according to a geometrical trigonometry, wherein
   a height of a triangle from its base is equal to the measurement distance A, the base of the triangle being a connection line L of an emitting point of the incident ray α and a receiving point of the second reflected ray θ, and a vertex angle of the triangle being an intersection angle of the incident ray α and an extension line of the second reflected ray θ.

2. The focusing method according to claim 1, wherein, an included angle ε between the connection line L of the emitting point of the incident ray α and the receiving point of the second reflected ray θ and the incident ray α is a known constant, and an included angle between the connection line L and the second reflected ray θ is ζ, wherein $$\zeta = \arcsin(X/(X2+Y2)^{1/2}); \text{ where}$$

X represents a distance between the receiving point and the laser imaging plane; and
Y represents a distance between a vertical line passing through the receiving point and perpendicular to the laser imaging plane and a laser image generated by the second reflected ray θ on the laser imaging plane.

3. The focusing method according to claim 1, wherein the object to be measured includes a transparent slide, the transparent slide including an upper surface and a lower surface, and a thickness of the transparent slide is equal to a difference between a measurement distance Au corresponding to the upper surface and a measurement distance Al corresponding to the lower surface.

4. The focusing method according to claim 3, further comprising:
   determining a flatness of the transparent slide based on thicknesses at different positions of the transparent slide.

5. The focusing method according to claim 1, wherein the object to be measured includes a sample, and when the first reflected ray β directly irradiates a surface of the sample, the actual distance between the object to be measured and the objective lens is C=C1+C2, and the distance conversion formula is:

$$A = D + C1; \text{ where}$$

the first reflected ray β and the return ray γ are coaxial or parallel to an axis of the objective lens with respect to a normal line of the object to be measured, D represents a distance from an intersection of the height of the triangle from its base and the laser reflecting mirror to the base of the triangle, and the base of the triangle is the connection line L of the emitting point of the incident ray α and the receiving point of the second reflected ray θ and the vertex angle of the triangle is the intersection angle of the incident ray α and the extension line of the second reflected ray θ.

6. The focusing method according to claim 1, wherein the object to be measured includes a sample and a transparent slide, and when the first reflected ray β passes through the transparent slide and irradiates a surface of the sample, the actual distance between the object to be measured and the objective lens is C=C1+C2+C3, and the distance conversion formula is:

$$A = D + C1; \text{ where}$$

the first reflected ray β and the return ray γ are coaxial or parallel to an axis of the objective lens with respect to a normal line of the object to be measured, C3 represents a thickness of the transparent slide, D represents a distance from an intersection of the height of the base of the triangle and the laser reflecting mirror to the base of the triangle, and the base of the triangle is the connection line L of the emitting point of the incident ray α and the receiving point of the second reflected ray θ and the vertex angle of the triangle is the intersection angle of the incident ray α and the extension line of the second reflected ray θ as the vertex angle.

7. A focusing system, applying the focusing method according to claim 1, the focusing system comprising:
- a system for laser distance measuring;
- a focus displacement component;
- the objective lens, arranged on the focus displacement component, and the focus displacement component being configured to move the objective lens along the axial direction of the objective lens relative to the object to be measured for auto-focusing,
- wherein the system for laser distance measuring comprises:
- the laser reflecting mirror;
- a laser emitting part configured to emit incident ray α having the incident angle δ to the reflective surface of the laser reflecting mirror, first reflected ray β being generated by the incident ray α being reflected, the return ray γ being generated by the first reflected ray β irradiating the surface of the object to be measured;
- a laser receiving part configured to receive the second reflected ray θ generated by the reflective surface of the laser reflecting mirror reflecting the return ray γ, and generate the laser image; and
- a calculation module configured to determine the measurement distance A based on the geometrical trigonometry and the laser image.

8. The focusing system according to claim 7, wherein the laser receiving part comprises:
- the laser imaging plane parallel to the connection line L of the emitting point of the incident ray α and the receiving point of the second reflected ray θ;
- a receiving lens configured to receive the second reflected ray θ and project the second reflected ray θ on the laser imaging plane, the second reflected ray e and the laser imaging plane having an included angle ζ, and an included angle between the connection line L of the emitting point of the incident ray α and the receiving point of the second reflected ray θ and the incident ray α being a known constant; wherein $\zeta = \arcsin(X/(X2+Y2)^{1/2})$; where X represents a distance between the receiving point and the laser imaging plane; and
Y represents a distance between a vertical line passing through the receiving point and perpendicular to the laser imaging plane and the laser image generated by the second reflected ray θ on the laser imaging plane.

9. The focusing system according to claim 7, wherein the laser reflecting mirror of the system for laser distance measuring includes a semi-transmissive and semi-reflective mirror.

10. The focusing system according to claim 7, wherein the first reflected ray β and the return ray γ are coaxial with an axis of the objective lens with respect to a normal line of the object to be measured.

11. The focusing system according to claim 7, wherein the laser reflecting mirror of the system for laser distance measuring is arranged at an avoidance position on a side of the objective lens close to the object to be measured, to avoid the objective lens;
the focusing system further comprises:
- a carrier, on which the object to be measured is placed;
- a translation component, drivingly connected to the carrier, and configured to drive the carrier to move, such that the object to be measured on the carrier optionally moves to a distance measuring station or an observation station, wherein along the axial direction of the objective lens, the distance measurement station faces the laser reflecting mirror, the observation station faces the objective lens, and the distance measuring station and the observation station are located in a plane perpendicular to an axis of the objective lens; and
- when the object to be measured is located at the distance measuring station, the focusing system is configured to measure and obtain the measurement distance A, and when the object to be measured is located at the observation station, the focusing system is configured to auto-focus, or obtain the measurement distance A and auto-focus.

12. The focusing system according to claim 7, further comprising:
- a control module, electrically connected with the laser emitting part of the system for laser distance measuring, the laser receiving part of the system for laser distance measuring, the focus displacement component, and the calculation module of the system for laser distance measuring, and configured to obtain the target object distance C0, the measurement distance A, and determine the actual distance C between the object to be measured and the objective lens, to control the movement of the focus displacement component, such that the actual distance C between the objective lens and the object to be measured is equal to the target object distance C0.

13. The focusing system according to claim 7, wherein the laser reflecting mirror of the system for laser distance measuring is inclined at 45 degrees to a horizontal plane, and the incident ray α is located in the horizontal plane.

14. The focusing system according to claim 7, wherein a thickness of the laser reflecting mirror of the system for laser distance measuring is 650 nm, and a wavelength of the incident ray α is 655 nm.

15. The focusing system according to claim 7, further comprising:
- a tube lens, arranged coaxially with the objective lens and on a side of the objective lens away from the laser reflecting mirror; and
- a camera arranged at an end of the tube lens away from the objective lens, and configured to photograph the object to be measured through the objective lens and the tube lens.

16. The focusing system according to claim 7, further comprising:
- a bright field light source arranged on a side of the laser reflecting mirror of the system for laser distance measuring facing the object to be measured, the object to be measured being located between the bright field light source and the laser reflecting mirror, and the bright field light source being configured to generate a bright field ray.

17. The focusing system according to claim 7, wherein the object to be measured comprises a sample and a transparent slide, the sample being carried on the transparent slide; and the focusing system further comprises:
- a carrier, the transparent slide being placed on the carrier, a ray-transmitting hole being opened on the carrier, and the first reflected ray β passing through the ray-transmitting hole, irradiating a lower surface of the transparent slide, and being reflected by the lower surface of the transparent slide to generate the return ray γ.

18. The focusing system according to claim 7, wherein the object to be measured comprises a sample and a transparent slide, the sample being carried on the transparent slide; and the focusing system further comprises:

a carrier, the transparent slide being placed on the carrier, the first reflected ray β directly irradiating an upper surface of the sample, and being reflected by the upper surface of the sample to generate the return ray γ.

\* \* \* \* \*